US010373299B1

(12) United States Patent
Holub et al.

(10) Patent No.: US 10,373,299 B1
(45) Date of Patent: Aug. 6, 2019

(54) COMPENSATING FOR GEOMETRIC DISTORTION OF IMAGES IN CONSTRAINED PROCESSING ENVIRONMENTS

(71) Applicant: Digimarc Corporation, Beaverton, OR (US)

(72) Inventors: Vojtech Holub, Portland, OR (US); Tomas Filler, Beaverton, OR (US); Brett A. Bradley, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 15/588,451

(22) Filed: May 5, 2017

Related U.S. Application Data

(60) Provisional application No. 62/332,470, filed on May 5, 2016.

(51) Int. Cl.
*G06T 5/00* (2006.01)
*G06T 3/00* (2006.01)
*G06T 1/00* (2006.01)

(52) U.S. Cl.
CPC ............ *G06T 5/006* (2013.01); *G06T 1/0064* (2013.01); *G06T 3/0006* (2013.01); *G06T 2201/0065* (2013.01)

(58) Field of Classification Search
USPC ................................. 382/100, 164; 708/490
See application file for complete search history.

(56) References Cited

U.S. PATENT DOCUMENTS 3,987,243 A 10/1976 Schwartz
5,949,055 A 9/1999 Fleet
6,278,798 B1 * 8/2001 Rao .................... G06K 9/6211 382/154
6,408,082 B1 6/2002 Rhoads
6,671,386 B1 12/2003 Shimizu
(Continued)

FOREIGN PATENT DOCUMENTS

JP 2002171395 A 6/2002

OTHER PUBLICATIONS

Machine Translation of P2002171395, cited in the International Search Report, dated Oct. 26, 2016, for PCT Application No. PCT/US2016/042635, PCT Publication No. WO2017011801.
(Continued)

*Primary Examiner* — Xuemei G Chen
(74) *Attorney, Agent, or Firm* — Digimarc Corporation

(57) ABSTRACT

An image processing method determines a geometric transform of a suspect image by efficiently evaluating a large number of geometric transform candidates in environments with limited processing resources. Processing resources are conserved by using configurations of dot product operations to produce both least squares mappings for each candidate and an error metric. Geometric transform candidates are rapidly winnowed to a smaller number of promising candidates based on the error metric and the promising candidates are refined further in subsequent iterations. An optimized method for determining updated coordinates for potential reference signal components in the suspect image evaluates a suspect image block at plural neighborhoods and builds a look up table that provides updated coordinates for each of the neighborhoods.

17 Claims, 14 Drawing Sheets

(56) References Cited

U.S. PATENT DOCUMENTS

| | | | | |
|---|---|---|---|---|
| 7,120,313 | B2 * | 10/2006 | Kotake | G06T 1/20<br>382/282 |
| 7,231,061 | B2 | 6/2007 | Bradley | |
| 7,466,840 | B2 | 12/2008 | Rhoads | |
| 8,126,260 | B2 * | 2/2012 | Wallack | G06K 9/32<br>382/154 |
| 8,200,010 | B1 * | 6/2012 | Jing | G06K 9/4671<br>382/164 |
| 8,750,560 | B2 | 6/2014 | Sharma | |
| 8,867,860 | B2 * | 10/2014 | Lyons | G06T 1/0064<br>382/100 |
| 8,948,445 | B2 * | 2/2015 | Mow | G06T 1/0021<br>382/100 |
| 9,182,778 | B2 * | 11/2015 | Sharma | G06T 1/0064 |
| 9,652,821 | B2 * | 5/2017 | Sharma | G06T 1/0064 |
| 9,836,807 | B2 | 12/2017 | Lyons | |
| 2002/0106104 | A1 | 8/2002 | Brunk | |
| 2002/0172396 | A1 | 11/2002 | Stach | |
| 2003/0072468 | A1 | 4/2003 | Brunk | |
| 2003/0081810 | A1 | 5/2003 | Bradley | |
| 2003/0133589 | A1 | 7/2003 | Deguillaume | |
| 2004/0086197 | A1 | 5/2004 | Fletcher | |
| 2004/0105569 | A1 | 6/2004 | Sharma | |
| 2004/0250078 | A1 | 12/2004 | Stach | |
| 2005/0111760 | A1 | 5/2005 | Lal | |
| 2006/0053189 | A1 * | 3/2006 | Mantor | G06F 11/2028<br>708/490 |
| 2006/0087458 | A1 | 4/2006 | Rodigast | |
| 2011/0044494 | A1 | 2/2011 | Bradley | |
| 2015/0106416 | A1 | 4/2015 | Lyons | |
| 2015/0250446 | A1 * | 9/2015 | Kanayama | A61B 8/06<br>600/438 |
| 2016/0132986 | A1 | 5/2016 | Sharma | |
| 2016/0188972 | A1 | 6/2016 | Lyons | |
| 2017/0068751 | A1 * | 3/2017 | Bulusu | G06F 17/5009 |

OTHER PUBLICATIONS

International Search Report and Written Opinion dated Oct. 26, 2016 for PCT Application No. PCT/US2016/042635, PCT Publication No. WO2017011801.

Fitzgibbon, A. W., Pilu, M and Fischer, R. B.: "Direct least squares fitting of ellipses", Department of Artificial Intelligence, The University of Edinburgh, Jan. 1996.

Holter, "The Optimal Weights of a Maximum Ratio Combiner using an Eigenfilter Approach", Norwegian University of Science and Technology Department of Telecommunications. 2002.

Macleod, 'Fast Nearly ML Estimation of the Parameters of Real or Complex Single Tones or Resolved Multiple Tones', IEEE Transactions on Signal Processing, vol. 46 No. 1, Jan. 1998.

Quinn, 'Estimating Frequency by Interpolation Using Fourier Coefficients,' May 1994.

Quinn, "Estimation of Frequency, Amplitude, and Phase from the DFT of a Time Series", IEEE Transactions on Signal Processing, vol. 45, No. 3, Mar. 1997.

Lohmann, 'Matched Filtering with Self-Luminous Objects', Mar. 1968, Applied Optics, vol. 7, issue 3, p. 561-563.

Pereira et al., 'Robust Template Matching for Affine Resistant Image Watermarks,' IEEE Trans. on Image Processing, vol. 9, No. 6, Jun. 2000, pp. 1123-1129.

O'Ruanaidh et al., 'Rotation, Scale and Translation Invariant Spread Spectrum Digital Image Watermarking,' Signal Processing 66, May 1, 1998, pp. 303-317.

O'Ruanaidh et al., "Phase Watermarking of Digital Images", Sep. 19, 1996, IEEE Int. Conf. on Image Processing, 1996. Proceedings, vol. 3, p. 239-242.

* cited by examiner

COMPENSATING FOR GEOMETRIC DISTORTION OF IMAGES IN CONSTRAINED PROCESSING ENVIRONMENTS

RELATED APPLICATION DATA

This application claims the benefit of U.S. Provisional Application 62/332,470, filed May 5, 2016, which is hereby incorporated by reference.

TECHNICAL FIELD

The invention relates image signal processing to recover geometric distortion of an image and associated image processing for extracting encoded auxiliary information from images.

BACKGROUND AND SUMMARY

For a variety of image processing applications, it is necessary to determine the geometric distortion of an image, and, compensate for it. Technical fields where this is important include image and object recognition. Another application is decoding machine readable data encoded into an optical data carrier within an image. This data carrier may be an overt optical code such as a two-dimensional (2D) barcode or an imperceptible signal incorporated into the image. In the latter case, the data carrier is incorporated into an image to meet image quality, data carrying capacity and signal robustness criteria. Digital watermarking is an example of enhancing an image to embed auxiliary data.

Compensating for geometric distortion is necessary in these applications to extend the range over which recognition and data decoding provide reliable results (referred to as the operational envelope).

One approach for determining geometric distortion employs signal structure within the image. The geometric transform is determined by deriving geometric transform parameters of the signal structure in a distorted image. The signal structure may be pre-determined and inserted within images. Alternatively, it may be derived from an arbitrary image and the derived image structure (e.g., a feature vector of spatial features) stored in a database as a reference signal for later use in matching stored reference structures with corresponding structure derived from a suspect image. In some applications, the signal structure is a hybrid of an auxiliary image structure and inherent signal structure already within a target image. Regardless of how the signal structure forms part of image, the objective of the image processing method is to ascertain the geometric transform of that signal structure efficiently and accurately. The method must be efficient because processing resources, battery power, memory and memory bandwidth are constrained for practical applications in mobile devices and automated data capture devices, such as fixed and handheld optical code scanners. Moreover, even in cloud side applications where processing is more plentiful, image recognition and data extraction need to be efficient and have a broader operational envelope to handle noisy and distorted imagery.

A suspect image may not contain expected image structure, and as such, processing expended trying to detect it is a waste of processing resources. Thus, it is advantageous that the image processing method not waste resources on futile operations. The method should enable the host system to converge rapidly to a reliable recognition result or reject image blocks that are unlikely to lead to a reliable result.

Moreover, many applications require real time or low latency performance, as the image processing task must operate on a real time, incoming stream of image blocks, and there are strict time and hardware resource constraints on the amount of time and hardware allocated to each block. Examples where these constraints are prevalent include a battery powered mobile device and an automatic data capture device (e.g., barcode scanner) operating on an input stream of frames captured by its digital camera.

One driver of low latency operation is to provide an acceptable user experience. The geometric distortion must be detected within a limited period of time as the user is capturing image frames of an object so that responsive actions may be triggered (e.g., fetching of object information and augmenting a virtual reality display of a live video stream). Another driver is the limit of the hardware to retain and analyze frames from a live input stream of frames being captured of an object. A limited number of frames may be buffered and analyzed before the buffers and processing logic are assigned to new frames being captured by a camera.

Images incur geometric distortion in a variety of ways. The technology of this disclosure is concerned with determining and compensating for geometric distortion that occurs to an image relative to its original state. In its original state, its structure is known, either because it has been generated to incorporate a particular structure or the structure has been derived from its inherent features. These properties may be spatial or transform domain features (e.g., spatial frequency or autocorrelation domain) like peaks (local maxima or minima), corners, edges, etc. From this initial state, the image is geometrically distorted when it is rendered to a display or marked on a substrate (e.g., paper or plastic of a product package or label). The image is further distorted, for example, when the object to which it is applied or displayed is distorted. Displayed images are distorted to fit a particular display device. When a package substrate material, such as a plastic or paper based substrate, is formed into a package, the image is distorted into the shape of the object. During use of the object, the image is further distorted (e.g., non-rigid objects are readily deformable during normal use, including when being imaged). Then, when the image is captured digitally, by an imager in a mobile device (e.g., smartphone, tablet) or automatic data capture equipment (e.g., fixed or handheld barcode scanner), it is distorted further. In light of these various sources of geometric distortion and image noise, it is challenging to determine the geometric transform of a suspect image relative to its original state.

FIGS. 1-4 illustrate aspects of the geometric distortion problem with a simplified depiction of an image scanner capturing an image of a package 10. The plane shown as line 12 from this side view corresponds to the glass surface of a flatbed scanner. To introduce baseline concepts of camera and package tilt in one dimension, we depict it as virtual scanner glass 12 in FIGS. 1-4. Actual geometric distortion tends to be more complex, with tilt and camera angle in different directions, finite focal length(s) of the camera, etc.

FIG. 1 depicts the case where the camera angle is zero degrees, the package is flat, and the camera is assumed to have infinite focal length. Through a camera lens 14, the camera in the scanner captures an image shown at line 16. In this case, the captured image has its X coordinates multiplied by 1, reflecting that no geometric distortion is introduced. For this example, we illustrate distortion in one axis, X, of the spatial coordinate space. Similar distortion occurs in other axes.

In FIG. 2, the package 10 is tilted on the virtual scanner glass by an angle Δ. In this case, the captured image has its X coordinates multiplied by cos Δ due to the tilt of the package.

In FIG. 3, the package 10 has no tilt but the camera angle is α. In this case, the captured image has X coordinates multiplied by cos α. In some capture devices, the camera angle relative to the scanner surface is known, such as in flatbed scanners. In other devices, it is not. If the camera angle is known, image pre-processing can potentially compensate for it by dividing the image coordinates by cos α. However, this pre-processing may introduce additional noise into the image, even if it is slightly incorrect.

FIG. 4 illustrates the case where the camera angle is α, and the package is tilted by angle Δ. In this case, the captured image has X coordinates multiplied by cos(α+Δ). With a correction for the camera angle, the distortion is:

$$\text{distoration} = \frac{\cos(\alpha + \Delta)}{\cos(\alpha)}$$

The optimal value of this function is 1. Otherwise, the image gets squished or stretched in a direction due to differential scale and sheer effects. FIG. 5 is a plot of the distortion for a fixed package angle Δ=10. As the camera angle increases, the distortion increases and becomes increasingly difficult to correct accurately. Further, in practice, additional geometric distortion, such as perspective distortion, is present, which is more challenging to compensate for in applications of image recognition and decoding machine readable data encoded in the distorted image.

In previous work, we have developed techniques for determining geometric transform parameters using log polar and least squares methods. Please see, in particular, U.S. Pat. Nos. 6,614,914, 7,152,021, 9,182,778, and U.S. patent application Ser. No. 14/724,729 (entitled DIFFERENTIAL MODULATION FOR ROBUST SIGNALING AND SYNCHRONIZATION)(now published as US Application Publication No. 20160217547), which describe various methods for determining geometric transformations of images. International Patent Application WO 2017/011801, entitled Signal Processors and Methods for Estimating Geometric Transformations of Images for Digital Data Extraction, provides additional disclosure, expanding on the technology in U.S. Pat. No. 9,182,778. In particular, WO 2017/011801 provides additional disclosure relating to the challenge of perspective distortion, including techniques for approximating perspective distortion with affine transform parameters. U.S. Pat. Nos. 6,614,914, 7,152,021, 9,182,778, US Publication 20160217547, and WO 2017/011801, are hereby incorporated by reference. See also Ser. No. 14/842,575, entitled HARDWARE-ADAPTABLE WATERMARK SYSTEMS (now published as US Application Publication No 20170004597), for more on implementation in various hardware configurations, which is hereby incorporated by reference.

While it is possible to approximate a perspective transform with an affine transform, an affine transform is not a perfect approximation. The focal length in scanner cameras is not infinity. To illustrate the point, a general perspective transformation can be described by the following homography matrix:

$$H = \begin{pmatrix} a_{11} & a_{12} & a_{13} \\ a_{21} & a_{22} & a_{23} \\ a_{31} & a_{32} & 1 \end{pmatrix}$$

The affine part of this matrix corresponds to parameters: $a_{11}$, $a_{12}$, $a_{21}$, $a_{22}$, and the purely perspective part of the matrix correspond to parameters: $a_{31}$, $a_{32}$. The translation part corresponds to parameters $a_{13}$ and $a_{23}$. Recovery of the affine parameters may approximate a perspective distortion, but this approximation is not always sufficient and some amount of correction for the perspective part is sometimes necessary.

In one approach, a direct least squares method is used to recover affine parameters and additional corrections are applied to correct the rest of the parameters (pure perspective and translation).

If designed properly, these various methods can provide an effective way to estimate geometric transform parameters. However, they can tend to consume significant computational resources or not sufficiently address certain forms of distortion, such as perspective. In this document, we describe methods that extend the operational envelope with improved efficiency and accuracy.

One aspect of the invention is a method of determining a geometric transform of an image. The method comprises:

obtaining a suspect image;

transforming the suspect image into an image feature space;

for plural geometric transform candidates, determining new geometric transform candidates by acts of:

a) obtaining transformed coordinates of reference signal components, the transformed coordinates having been geometrically transformed by a geometric transform candidate;

b) for the reference signal components, determining updated coordinates by locating an image feature in a neighborhood in the suspect image around the transformed coordinates of a reference signal component, the image feature corresponding to a potential reference signal component in the suspect image;

c) determining a new geometric transform that provides a least squares mapping between coordinates of the reference signal components and the updated coordinates; the new geometric transform parameters being computed by dot product operations on the coordinates of the reference signal components and the updated coordinates; and d) from the dot product operations, obtaining a least squares error metric for the new geometric transform candidate;

for the new geometric transform candidates, comparing the least squares error metric for the new geometric transform candidate to a threshold;

discarding new geometric transform candidates having a least squares error metric exceeding the threshold; and refining new geometric transform candidates having a least squares error metric that does not exceed the threshold.

This method is implemented in instructions executed on one or more programmable processor units, or in alternative digital logic circuitry, as detailed further below.

Another aspect of the invention is an image processing device comprising:

a memory in which is stored a suspect image in an image feature space;

a first buffer;

a second buffer;

a processor system comprising a first processing unit and a vector processing unit;

the first processing unit configured to load reference signal coordinates of reference signal components into the first buffer, to obtain transformed reference signal coordinates for a geometric transform candidate, and for each of the transformed reference signal coordinates, locate updated coordinates of a potential reference signal component in the suspect image in neighborhoods around the transformed reference signal coordinates, and configured to load the updated coordinates into the second buffer;

the vector processing unit configured to obtain a vector of the reference signal coordinates from the first buffer and obtain a corresponding vector of updated coordinates from the second buffer and execute dot product operations on the vectors to determine a new geometric transform that provides a least squares mapping between the reference signal coordinates and updated coordinates, the vector processing unit further configured to compute additional dot products used as input to compute a least squares error metric;

the processing system configured to compute the least squares metric from output of the additional dot products for plural geometric transform candidates processed by the vector processing unit to determine corresponding new geometric transforms, configured to compare the least squares metrics to a threshold, and configured to select new geometric transform candidates to refine based on comparing the least squares metrics to a threshold.

These methods, systems and circuitry provide reliable, and computationally efficient recovery of geometric transforms of data carrying signals embedded in images on physical objects. As such, they improve the data carrying capacity and robustness of the data carrying signals, and the aesthetic quality of the images with these data carrying signals. Aesthetic quality of imagery is enhanced because the inventive technology enables detection of weaker data carrying signals and data signals that are blended into host imagery and other information bearing content on objects, like product packaging and labels.

Further inventive features will become apparent in the following detailed description and accompanying drawings.

DETAILED DESCRIPTION

Figure 1:
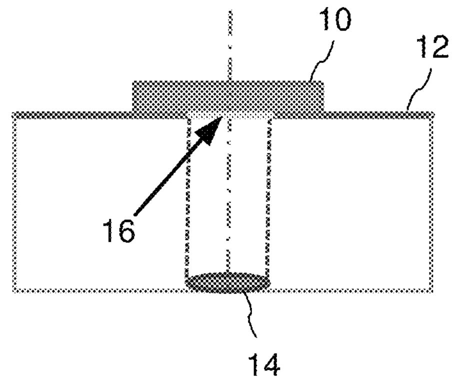
FIGS. 1-4 are diagrams illustrating aspects of the geometric distortion in image capture.
Figure 2:
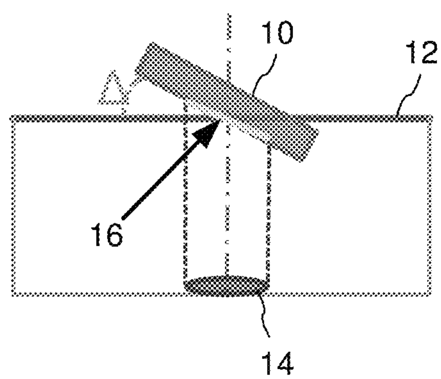
Figure 3:
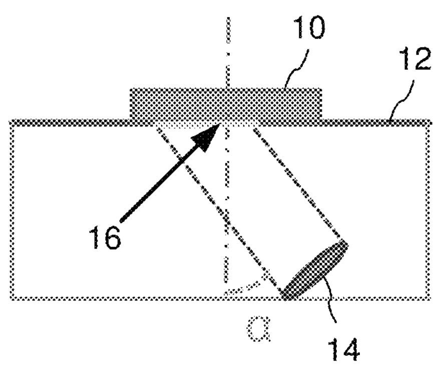
Figure 4:
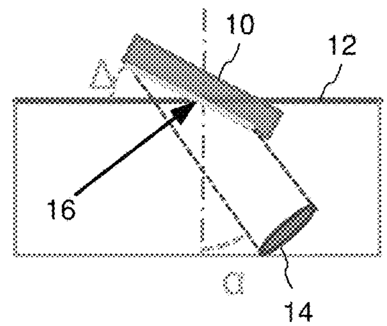
Figure 5:
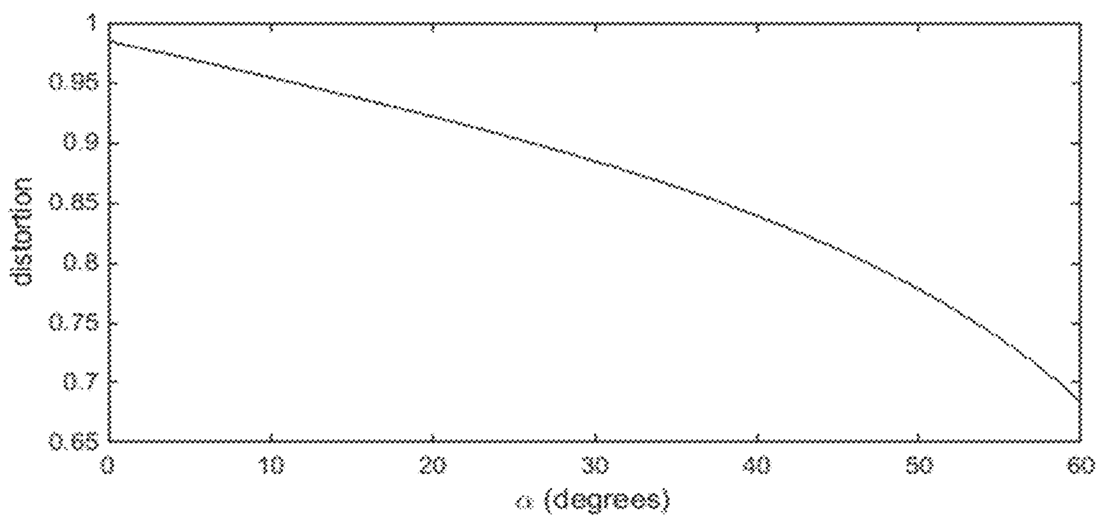
FIG. 5 is a plot of image distortion as a function of camera angle to illustrate geometric distortion within image capture.
Figure 6:
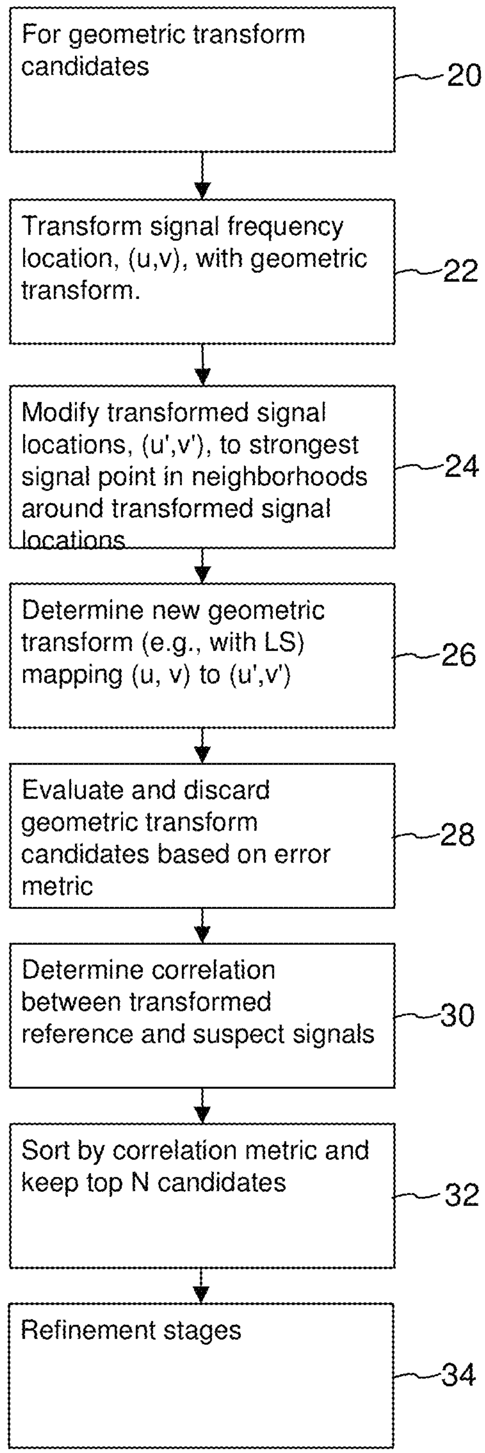
FIG. 6 is a flow diagram illustrating a method for determining a geometric transform of an image.

We begin with a description of our method for determining a geometric transform of an image with reference to FIG. 6. We then describe various alternative implementation details. For additional background, we refer the reader to U.S. Pat. No. 9,182,778 and Provisional Application 62/199,710. The International Patent Application counterpart to 62/199,710, is WO 2017/011801, and both of these applications are hereby incorporated by reference.

FIG. 6 is a flow diagram illustrating a method for determining a geometric transform of an image. This method is used to find the geometric transform of a reference signal within a suspect image. The method seeks to determine the geometric transform parameters that best approximate the geometric transform between reference signal components and corresponding signal components located in the suspect image. It is not certain that the suspect image contains the reference signal. Moreover, even if it does, it is highly distorted due to geometric distortion and other sources of noise. Thus, the correspondence between a reference signal component and a corresponding feature believed to be a reference component contributes error when the feature is noise, instead of an actual reference signal component.

The reference signal is comprised of reference signal components in an image feature space. In embodiments of the method, the reference signal components are comprised of peaks in the image feature space. In particular implementations, the image feature space is a spatial frequency domain, and the reference signal components have known pseudorandom phase. This type of reference signal is representative of other signal structures to which this technology may be applied.

In one application, the reference signal forms part of the signal structure of an encoded auxiliary data signal encoded within an image. The auxiliary data signal is encoded in digital image comprised of a two-dimensional array of pixels at a spatial resolution, typically in the range of 75 to 300 Dots Per Inch (DPI). The auxiliary signal is redundantly encoded in contiguous blocks of pixels at this spatial resolution. The blocks are comprised of 2D dimensional array of auxiliary data signal elements (e.g., 64 by 64, 128 by 128, 256 by 256) at pre-determined DPI, e.g., 75 or 100. The resolution of the auxiliary signal (e.g., 75 DPI) may be lower than the resolution of the target image (e.g., 300 DPI). In this case, each element of a 2D block of the auxiliary signal is mapped to a cell of neighboring pixels and may be shaped or otherwise filtered to improve image quality or robustness. The auxiliary signal is incorporated into one or more color directions of a digital image (specifically, the encoding of a machine readable signal in one or more chrominance directions and/or luminance).

This digital image is applied to objects by various printing technologies. Examples include offset, flexographic, gravure, digital offset, ink jet, and laser marking, to name a few. From these objects, suspect digital images are captured via a digital camera (e.g., a CMOS or CCD sensor). Various combinations of illumination, color filter and/or monochrome, color, or multi-spectral imagers may be employed to capture the suspect digital images and provide image frames of pixels, with pixels values in one more color directions or spectral bands (R, G, B or other).

In a pre-processing step, the captured suspect image is transformed to the image feature space of the reference signal components. This pre-processing includes image transformations to convert the input image to the image feature space. The image pixels obtained from the camera are sampled at a spatial resolution, which typically differs from the resolution of the original image at the time of encoding, which contributes to the geometric distortion of the reference signal. Color pixels may be transformed into one or more color directions in which the auxiliary signal is encoded. For our implementation, reference signal components are located in image blocks of the original image as noted, so processing of a suspect image is also block based. Accordingly, captured image frames are subdivided into image blocks.

Next, the incoming image blocks are pre-processed and converted to the image feature space. For a reference signal in the spatial frequency domain, the image blocks are transformed to a spatial frequency domain, comprising 2D blocks of spatial frequency components (magnitude and phase components) at integer coordinates. This pre-processing entails, for example, a window operation and a Fourier transform on an image block (a 2D block of pixels from an incoming frame, such as 64 by 64, 128 by 128, 256 by 256, etc. pixel blocks) at a target spatial resolution (e.g., in the range from about 75 to 300 DPI)). In some implementations, image blocks may be accumulated to take advantage of redundant encoding of the reference signal structure (e.g., in the Fourier magnitude domain).

The resulting suspect image block is stored in a buffer in RAM memory, which is processed further to recover the geometric transform parameters of the suspect image. These parameters approximate the geometric transform between an original image and the suspect image.

As noted above, there are processing constraints on the amount of processing that may be performed on each image block, and as such, we developed our method to counteract a wide range of geometric distortion, yet do so efficiently. This has several benefits, as noted throughout this description.

The method of FIG. 6 begins with a set of initial geometric transform parameter candidates and evaluates them efficiently to converge on a significantly reduced set of candidates for further refinement. The efficiency of this approach, in terms of use of processing resources and processing time, is that it tests a large number of initial transform candidates, extending the geometric distortion range, while reliably reducing the candidates to a smaller set of viable ones that refined further.

Block 20 in FIG. 6 shows that the method begins with initial geometric transform candidates. We refer to these initial candidates as "seeds" as they are the starting candidates. These candidates are sampled from a search space of linear transform candidates, e.g., comprising rotation, scale, differential scale and shear parameters. U.S. Pat. No. 9,182,778 provides an example where initial candidates include rotation and scale, and are sampled uniformly across an operational envelope of spatial scales (magnifying or shrinking relative to original image scale) and rotations. International Application WO 2017/011801 describes various techniques in which initial rotation and scale candidates are expanded with differential scale and shear parameters, which provides better initial coverage to approximate perspective transformation with the differential scale and shear parameters.

We have observed that, to compensate for geometric distortion of images on packages, initial seed generation should not sample differential scale and shear uniformly. While tilt angles and tilt directions preferably are sampled uniformly, differential scale and shear may be sampled non-uniformly to achieve uniform coverage in terms of angles. As such, rotation seeds for the neighboring 2 scales are offset.

Figure 13:
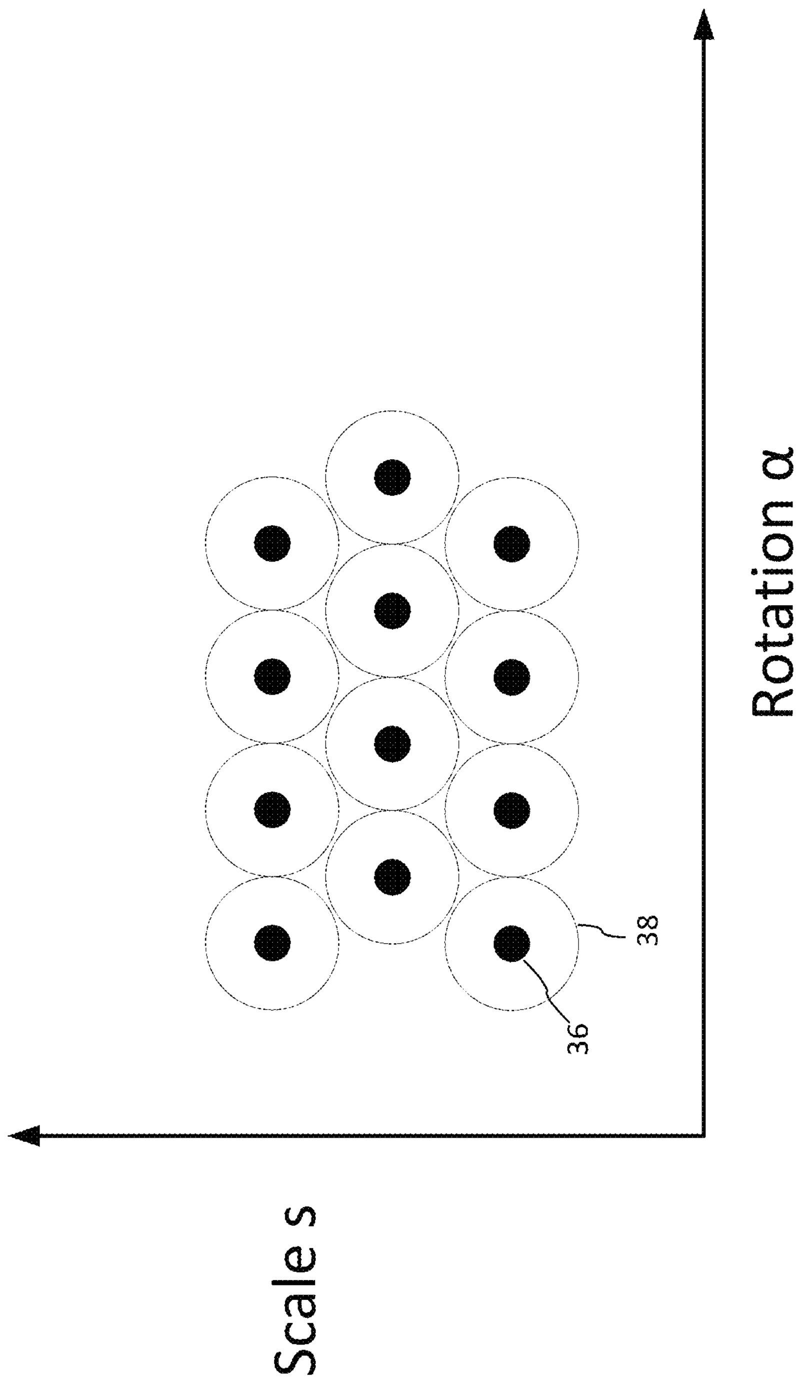
FIG. 13 is a diagram illustrating how seeds for geometric transform candidates are fit within a geometric transform space.

FIG. 13 is an example of seeds 36 in a 2D parameter space, illustrating this offset. In this example, the dots 36 are seed candidates, comprised of rotation and scale. Because the operational envelope of a single seed is likely to be circular (e.g., circular region 38 around seed 36) and not cube-like, we have observed that it is better to offset all rotations in even scales by half the rotation step. Odd scales are intact. Extending this example to additional dimensions of differential scale and shear, similar reasoning applies to filling the 4D space. The seeds are located at coordinates so that the operational envelopes around each seed provide better coverage of the 4D space. For instance, with another dimension, the circular operational envelope 38 becomes a sphere, and the seeds are offset to fit the spheres within the space to provide optimal coverage of the space. One can envision this space filling as balls packed into a 3D space.

This sampling of the 4D parameter space produces better coverage of that space and provides an operational envelope of the auxiliary data signal decoder without unwanted gaps. In one implementation for point of sale scanners, we employ around 800 seeds covering a 4D affine transform parameter space, but the number of seeds varies with the application, and its operational attributes, reference signal characteristics, operational envelope and performance criteria. For mobile devices like smartphones with more computational resources, we can increase the number of seeds to around 5000. The number of seeds is a configurable parameter that is set for the application and device.

Figure 14:
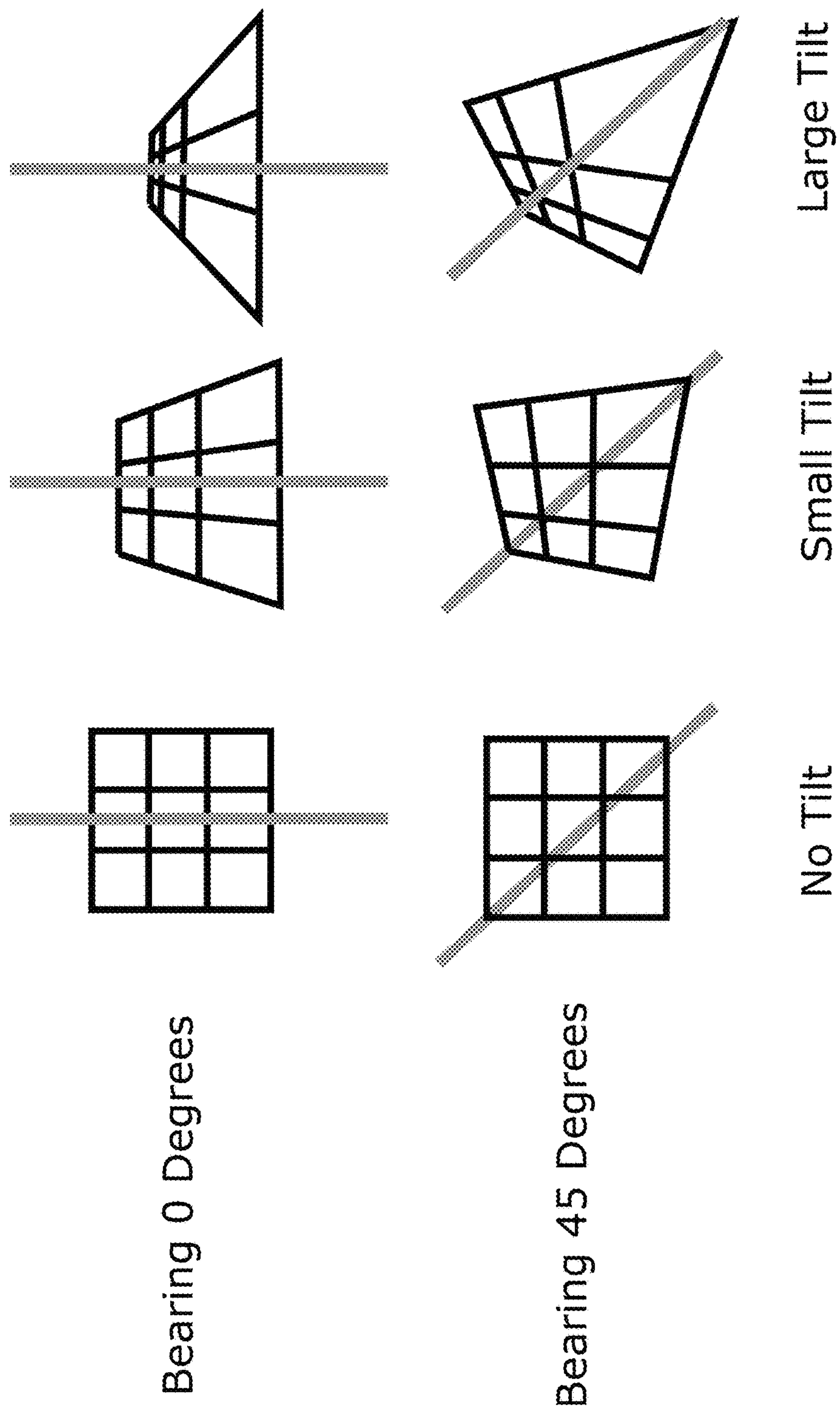
FIG. 14 is a diagram illustrating bearing and tilt parameters relative to a plane of image tiles on an object captured by a camera.

The sampling of the parameters space to obtain candidate seeds may also be performed according to scale, bearing and tilt parameters. This useful for applications where a user or machine (e.g., robot or drone) is expected to image the object within a predicted range of distances and tilts along bearing directions relative to a camera. FIG. 14 is a diagram illustrating bearing and tilt parameters relative to a plane of image tiles on an object captured by a camera. As shown, the tilt represents the angle the object is rotated into/away from a camera. The bearing is the angle representing the direction of tilt. For mobile applications in which a user scans a face of a product, a user may be expected to roughly align the camera at bearing of 0 or 90 degrees relative to a product face, yet recognition must accommodate a range of distances and tilt angles. Thus, in establishing initial candidate seeds, it is helpful to select seed candidates consistent with this expected behavior.

Figure 15:
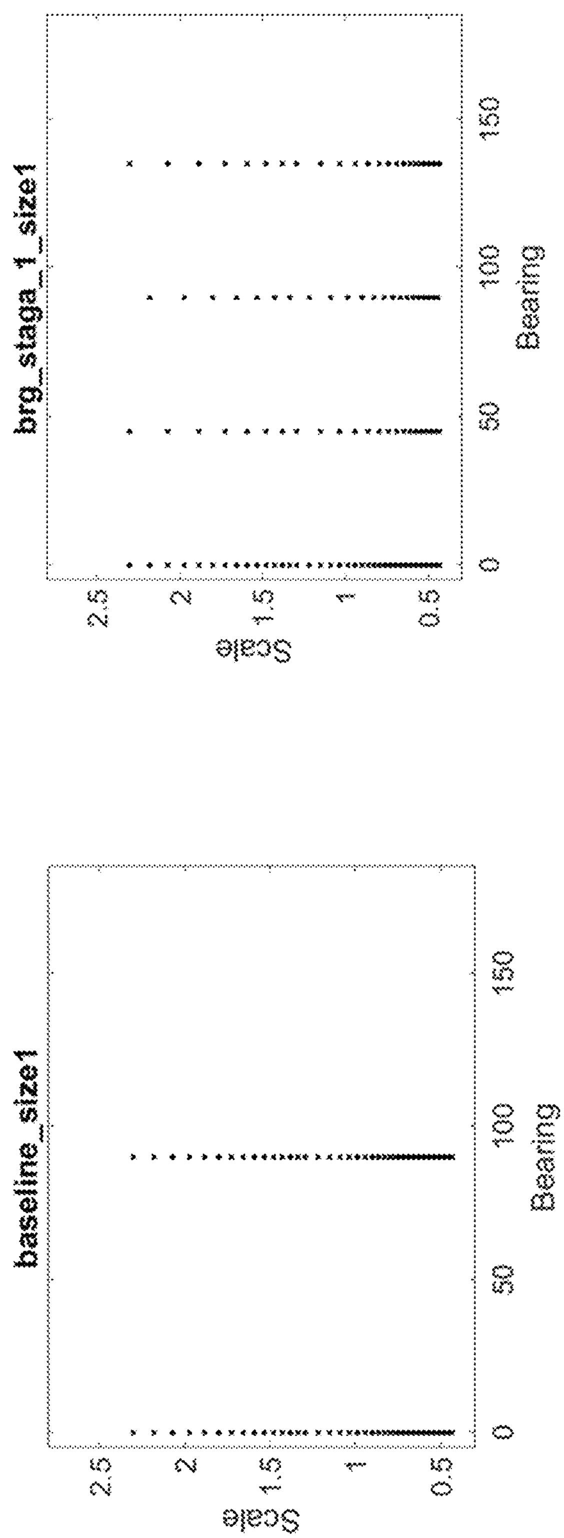
FIG. 15 is a diagram showing seed transform candidates in terms of scale and bearing parameter axes in transform parameter space.

FIG. 15 is a diagram showing seed transform candidates in terms of scale and bearing parameter axes in transform parameter space. The plot on the left shows a baseline set of candidates. We analyzed the impact of increasing the number of bearing candidates as well as varying the spacing of the candidates. Here, the seeds at four bearing angles vary in spacing along the scale axis. In these examples, the scale of the candidates ranges from around 40%-250% spatial scale (2.5-0.4 on frequency scale 1, where the original scale of the watermark/reference signal is frequency scale 1). The scale range is configurable for the application (e.g., the range shown in FIG. 15 is around 0.43-2.3). The seed candidates also cover a range of tilt angles. For each bearing and scale parameter pair, there are seed candidates for a range of tilt angles. For example in mobile device reader applications, the tilt angles are selected to range from 0 to 50 degrees. The parameter space may be more constrained in fixed scanners, where the product position and orientation relative to camera(s) of the scanner is more constrained. As such, depending on the device, reader environment and application, the spacing between parameter values within a parameter space is selected to best fit the parameter space and computational constraints of the recognition technology. Parameter spacing along a particular axis in parameter space may be uniform (e.g., every 5 or 10 degrees) or arranged to give more granular or detailed coverage in ranges of more likely scale, bearing and tilt, as ascertained from experiments of users (or robotic simulation of users) scanning various objects with the capture device in question.

In FIG. 15, an example of the variation in parameter spacing from one bearing candidate to another can be seen by comparing the two plots labeled "brg" to the baseline. The scale parameters at each bearing angle are offset from each other to provide better coverage of the parameter space. Our evaluation revealed that this offset variation has a similar effect as adding bearing candidates. This variation increases the range of angles at which tilted image recovery is feasible with no additional computational cost, and it has negligible impact on un-tilted image recovery.

Figure 16:
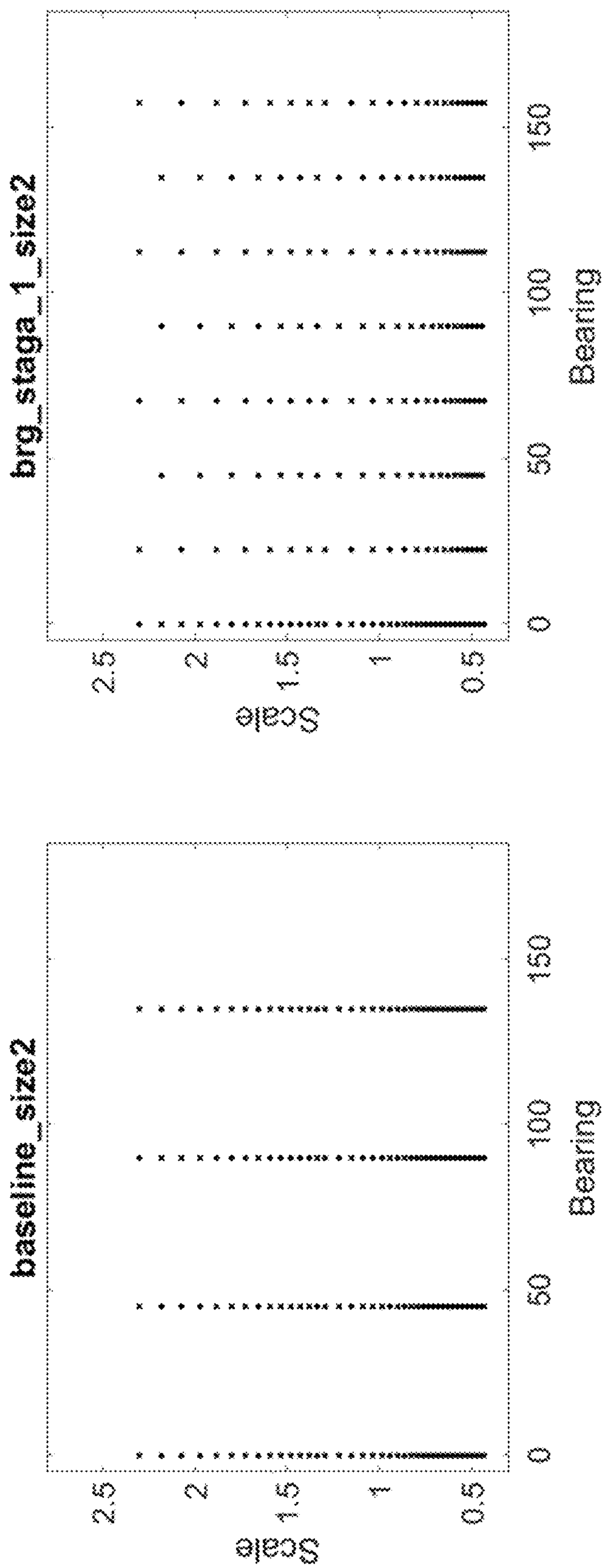
FIG. 16 is another example of seed transform candidates, similar to FIG. 15, yet with 8 bearing angles.

FIG. 16 is another example of seed transform candidates, similar to FIG. 15, yet with 8 bearing angles. We find that as the candidates cover the transform candidate space more effectively, we can increase the number of candidates without substantial increase in computational resources because the detector needs fewer refinement stages to provide geometric transform parameters sufficient to synchronize to data embedding locations of a digital watermark, leading to successful decoding of a digital watermark payload.

In some embodiments, transform candidates are generated by a pre-processing stage that provides candidate transforms from a reference signal detection process. For example, initial rotation and scale candidates, in one such approach, are generated by correlating a reference signal (e.g., comprised of impulse functions or peaks) with a filtered image block in a log polar coordinate space of rotation and scale parameters. There are alternative structures for such correlating a template with the image data, such as matched filter, and in particular, an impulse matched filter, where the template is comprised of impulses or peaks. The locations of correlation peaks in the correlation output of the correlating process in this log polar space are at pairs of rotation and scale parameters. These pairs of rotation and scale provide candidate transforms for refinement. The refinement stages iterate to find varying scale, bearing, tilt, (or like parameters of differential scale and shear) that improve upon the correlation of the reference signal and image data.

In another embodiment, a pose estimation method ascertains a rough estimate of pose of an object surface from which a range of scales, tilt and bearing candidates are adapted for refinement. The pose estimate may be expressed in terms of depth, scale, bearing, tilt, or equivalent geometric transform parameters of the object surface relative to a camera. This pose estimation may employ feature recognition and tracking (e.g., structure from motion) for frames of captured video to provide a pose estimate from feature points detected within an image of an object. The pose estimation may also employ depth values of image pixels obtained from a depth sensor associated with the camera, such as a depth sensor employing structured light, time of flight, and/or stereo imaging from two or more cameras.

The detector may also use the known size and shape of an object to approximate scale and orientation. In one embodiment the detector detects an object in one or more image frames by image recognition or template matching. This recognition may be performed on object shape, extracted feature points from an image of the object, or template matching or recognition of a logo, icon or visible barcode on the object. The detector retrieves its original size and shape, which is stored by object identity. By comparing the original size and shape of the object (or object image feature) to the detected size and shape, an embodiment of the detector derives an approximate scale and orientation of the object relative to its original scale and orientation and concentrates its selection and density of seed candidates around transforms encompassing the approximate scale and orientation (e.g., bearing and/or tilt). Reference images on the object, like logos or visible barcodes of known dimension, are useful to approximate scale and orientation.

In block 22, the method transforms reference signal components with each of the initial seed candidate transforms. In particular, the frequency components of the reference signal at frequency domain coordinates (u, v) are transformed to coordinates (u', v'). One option is to transform each reference signal by each geometric transform candidate. However, if the original reference signal is fixed or known, the transformed components may be pre-computed for each seed and stored in memory of an image processing device (e.g., in shared memory of the image processing application executing with that device).

In one implementation, this part of the process is implemented by accessing from memory a list pre-transformed reference signal components. This is an initial set of (u, v) coordinates pre-transformed by linear transforms covering rotation, scale and affine tilts (or as noted, scales, bearing and tilt angles). The list comprises, for each linear transform candidate, the set of linear transformed coordinates, (u', v') of the reference signal.

Block 24 corresponds to the process of finding, for each transformed component at coordinate (u', v'), an updated coordinate in a neighborhood within the suspect image block around (u', v'). This is a search in the neighborhood for attributes of a component of the reference signal in the suspect image block. The size of the neighborhood is a region of integer coordinates around (u', v'), as illustrated in more detail below. The parameters defining this region are preferably adaptive based on where a particular transformed coordinate is within the coordinate space of a reference signal component, and/or the density of reference signal components in the region around that particular location. The neighborhood size and shape may also adapt depending on where the transform candidate is within transform parameter space or density of transform candidates around the transform candidate. We discuss examples of this adaptation further below.

Where the component corresponds to frequency domain peak with an associated phase specification, the search may include finding a location that best matches the magnitude and phase of the component. In some embodiments, this process searches for a peak, while in others, it searches for peak with phase attributes that correspond to the reference signal component.

In block 26, the method finds a new geometric transform that maps the components of the reference signal to the updated locations found in the processing of block 24. Our approach for this processing is a least squares method. Due to the nature of the reference signal, this method is implemented efficiently using multiply and add operations in digital hardware logic, or for software implementation, in instructions for a processor preferably supporting vector operations.

In one implementation, the least squares method determines the best fit affine transform of the original reference signal to the reference signal detected in the suspect image. The reference signal is comprised of a set of components at coordinates (u, v). The least squares method has, for each component, corresponding coordinates (u', v') in the suspect image provided by the coordinate update process of block 24. A least squares calculator then finds the mapping between these corresponding coordinate pairs, which is output as a set of affine transform parameters $a_{11}$, $a_{12}$, $a_{21}$, $a_{22}$. The mapping is shown in the following expression:

$$\begin{bmatrix} u_i' \\ v_i' \end{bmatrix} = \begin{bmatrix} a_{11} & a_{12} \\ a_{21} & a_{22} \end{bmatrix} \begin{bmatrix} u_i \\ v_i \end{bmatrix}$$

The square error of the mapping is shown by the following expression:

$$E = \sum_{i=1}^{N} [u_i' - (a_{11}u_i + a_{12}v_i)]^2 + \sum_{i=1}^{N} [v_i' - (a_{12}u_i + a_{22}v_i)]^2$$

The affine transform parameters that minimize the square error E can be computed as follows:

$$a_{12} = (S_{u'u}S_{uv} - S_{uu}S_{u'v}) / (S_{uv}S_{uv} - S_{uu}S_{vv})$$

$$a_{11} = (S_{u'u} - a_{12}S_{uv}) / (S_{uu})$$

$$a_{22} = (S_{uv'}S_{uv} - S_{uu}S_{vv'}) / (S_{uv}S_{uv} - S_{uu}S_{vv})$$

$$a_{21} = (S_{uv'} - a_{22}S_{uv}) / (S_{uu})$$

Where $$S_{pq} = \sum_{i=1}^{N} p_i q_i,$$

which is a dot product, computed with multiply and add operations, which are efficiently implemented in digital logic hardware or in software instructions for a processor with vector operation support (vector processor), such as ARM NEON processors. These types of processors with vector support are in both fixed scanners, and hand held scanners, as well as mobile devices with cameras, like smartphones and tablets.

For a reference signal comprised of discrete frequency components, the expression for the transform parameters simplifies to:

$$a_{12}=(S_{u'u}S_{uv}-S_{uu}S_{u'v})/(S_{uv}S_{uv}-S_{uu}S_{vv})=S_{u'v}/S_{vv}$$

$$a_{11}=(S_{u'u}-a_{12}S_{uv})/(S_{uu})=S_{u'u}/S_{uu}$$

$$a_{22}=(S_{uv'}S_{uv}-S_{uu}S_{vv'})/(S_{uv}S_{uv}-S_{uu}S_{vv})=S_{vv'}/S_{vv}$$

$$a_{21}=(S_{uv'}-a_{22}S_{uv})/(S_{uu})=S_{uv'}/S_{uu}$$

The least squares calculator, implemented in digital logic or vector processor, operates on the pairs of (u, v) and corresponding (u', v'), using the above expression to generate these transform parameters.

The least squares error for these parameters is:

$$E = \sum_{i=1}^{N} [u_i' - (a_{11}u_i + a_{12}v_i)]^2 + \sum_{i=1}^{N} [v_i' - (a_{21}u_i + a_{22}v_i)]^2$$

The above may also be expressed in the following notation:

$$E = S_{u'u'} - \frac{(S_{u'u})^2}{S_{uu}} - \frac{(S_{u'v})^2}{S_{vv}} + S_{v'v'} - \frac{(S_{uv'})^2}{S_{uu}} - \frac{(S_{vv'})^2}{S_{vv}}$$

$S_{uu}$ and $S_{vv}$ are fixed and known from the definition of the reference signal. Therefore, they may be pre-stored in a memory unit (e.g., RAM, ROM, register, etc.) of the image processing device executing the method. Dot products $S_{u'u}$, $S_{u'v}$, $S_{uv'}$, $S_{vv'}$ are calculated by the least squares calculator as noted. For more on the least squares calculator implementation, please see U.S. Pat. No. 9,182,778 and International Application WO 2017/011801.

$S_{u'u'}$ and $S_{v'v'}$ are used for efficient least squares error evaluation. In one implementation of this method, the least squares error of a geometric transform candidate is used as a metric for evaluating whether further processing should be expended a refining a geometric transform candidate in subsequent iterations as explained further below.

In block 28, the method evaluates the least squares error of the geometric transform candidates produced in the processing of block 26. This evaluation indicates which of these candidates to discard and which to refine further. In one embodiment, the evaluation compares the least squares error metric (i.e. the sum of residual calculated from the above expression) with a threshold, and the candidates whose metric exceed the threshold are discarded.

In another embodiment, the evaluation in block 28 sorts the candidates by least squares error metric, and keeps a fraction of the original number of candidates. In one approach, the embodiment keeps the top ¼$^{th}$ candidates by lowest least squares error metric. Here the threshold is set by a predetermined fraction of the best candidates based on the least squares error metric.

The least squares metric is computed with minimal additional computational cost because the additional dot products, $S_{u'u'}$ and $S_{v'v'}$, employed in producing the metric, are computed in a vector processor implementing the least squares calculator. These dot products are produced along with the dot products that yield the affine transform parameters.

By discarding the candidates with this threshold at this stage, the process of determining the geometric transform reduces computation significantly without sacrificing accuracy or reliability of the result. The candidates are winnowed to those that provide the best mapping of the reference signal to the suspect image block.

In block 30, the process determines a correlation metric for each of the remaining geometric transforms. To compute the correlation, the transformed reference signal is correlated with the suspect image block. Computational efficiency is achieved by summing the correlation between each transformed reference signal component and a sampling of the suspect signal at the transformed reference signal coordinates. For a sparse reference signal, this correlation may be simplified to sampling and summing the suspect image at the transformed reference signal coordinates. The suspect image Fourier magnitude domain may be sampled in a 2 by 2 or 3 by 3 region around each transformed reference signal coordinate, where the reference signal is comprised of a sparse array of peaks (e.g., 30 to 120 peaks, and preferably 50-70) in the Fourier magnitude domain. As above, this region size and shape may be adaptively selected.

In block 32, the process sorts the transforms by their correlation metric determined in block 30. The top N candidates (e.g., 100) are retained for subsequent refinement stages 34. We illustrate examples of refinement stages below. These refinement stages take the candidates from a previous stage and seek to winnow them further to find the best candidates to employ for subsequent image processing.

One embodiment of the least squares error thresholds is derived by analyzing the least squares error metric for a large set of test images (e.g., at least 1000 images) captured on a target image capture device or group of image capture devices of interest. The test images include an auxiliary data signal encoded within them (e.g., using a methodology of U.S. Pat. No. 6,614,914). This auxiliary data signal is decoded to differentiate a first group of candidate transforms that lead to a successful decode from a second group that do not. By evaluating the distributions of the metric for these two groups, a threshold is selected for use in a computationally efficient geometric transform estimator. The geometric transform estimator uses the threshold in one or more stages of refinement to discard poor geometric transform candidates, and thereby, substantially reduces processing time.

Figure 7:
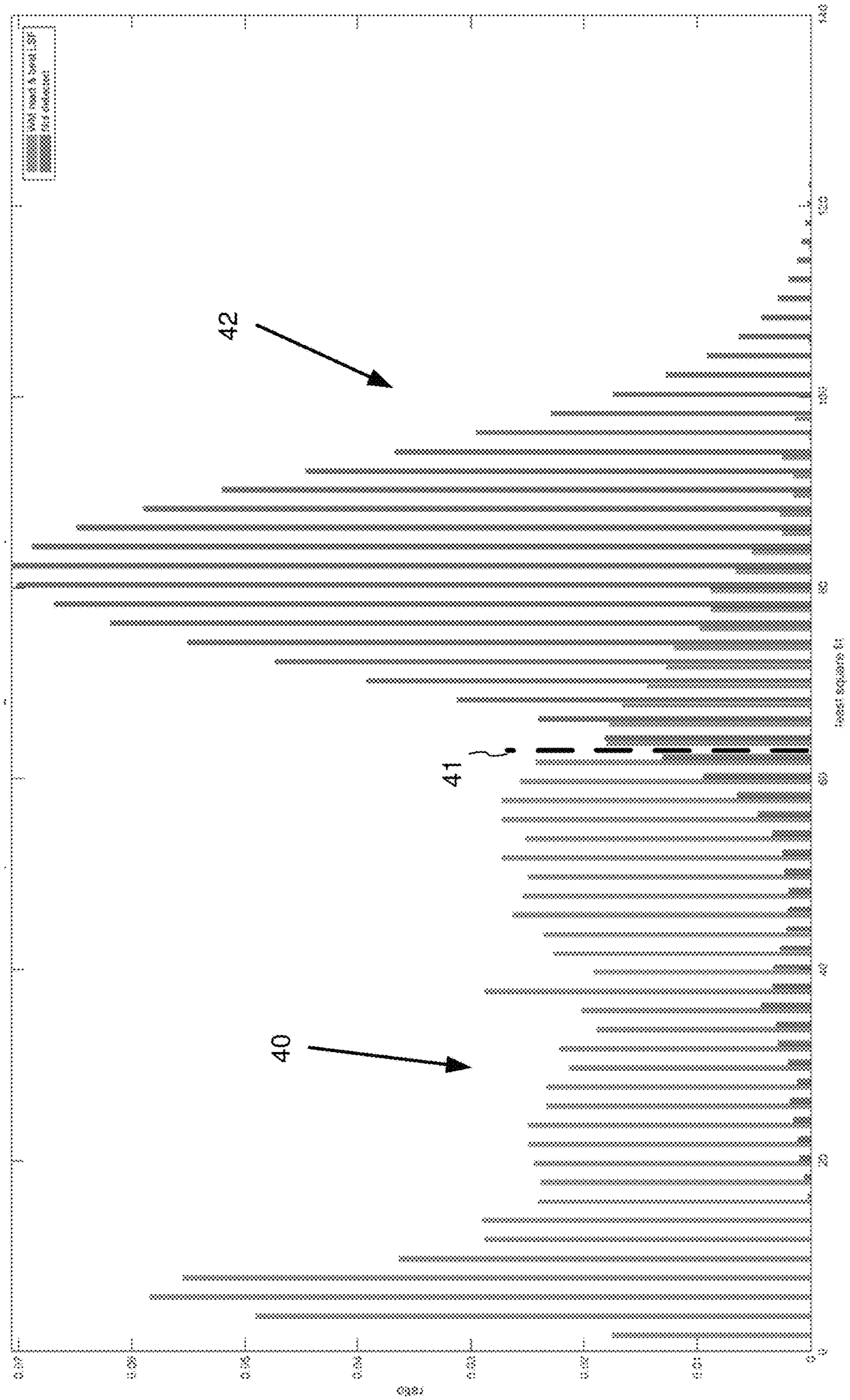
FIG. 7 is a diagram illustrating histograms of an error metric, where one histogram represents geometric transform candidates that lead to successful recognition, and other does not.

FIG. 7 is a diagram illustrating histograms of the least squares metric for geometric transform candidates. These histograms are generated from a set of about 800 seed linear transform candidates, selected to cover the 4-dimensional linear transform space as described above for block 20 of FIG. 6. The histogram 40 on the left is the histogram of the values of least squares metrics for geometric transform candidates that ultimately lead to a successful decode. In contrast, the histogram 42 on the right is the histogram of the values of the least squares error metrics for geometric transform candidates that do not lead to a successful decode. The plots are normalized so that each sums to 1. The vertical axis represents the number of candidates, while the vertical access represents the least squares error metric. A suitable threshold is the least squares error metric at the dashed line 41. This threshold is selected to retain the promising candidates to the left in the histogram 40, while mostly discarding the unsuccessful candidates in the histogram 42 on the right. The histogram may be moved even further to the left to discard more candidates because the analysis shows that there will be a significant number of good candidates remaining.

Figure 8:
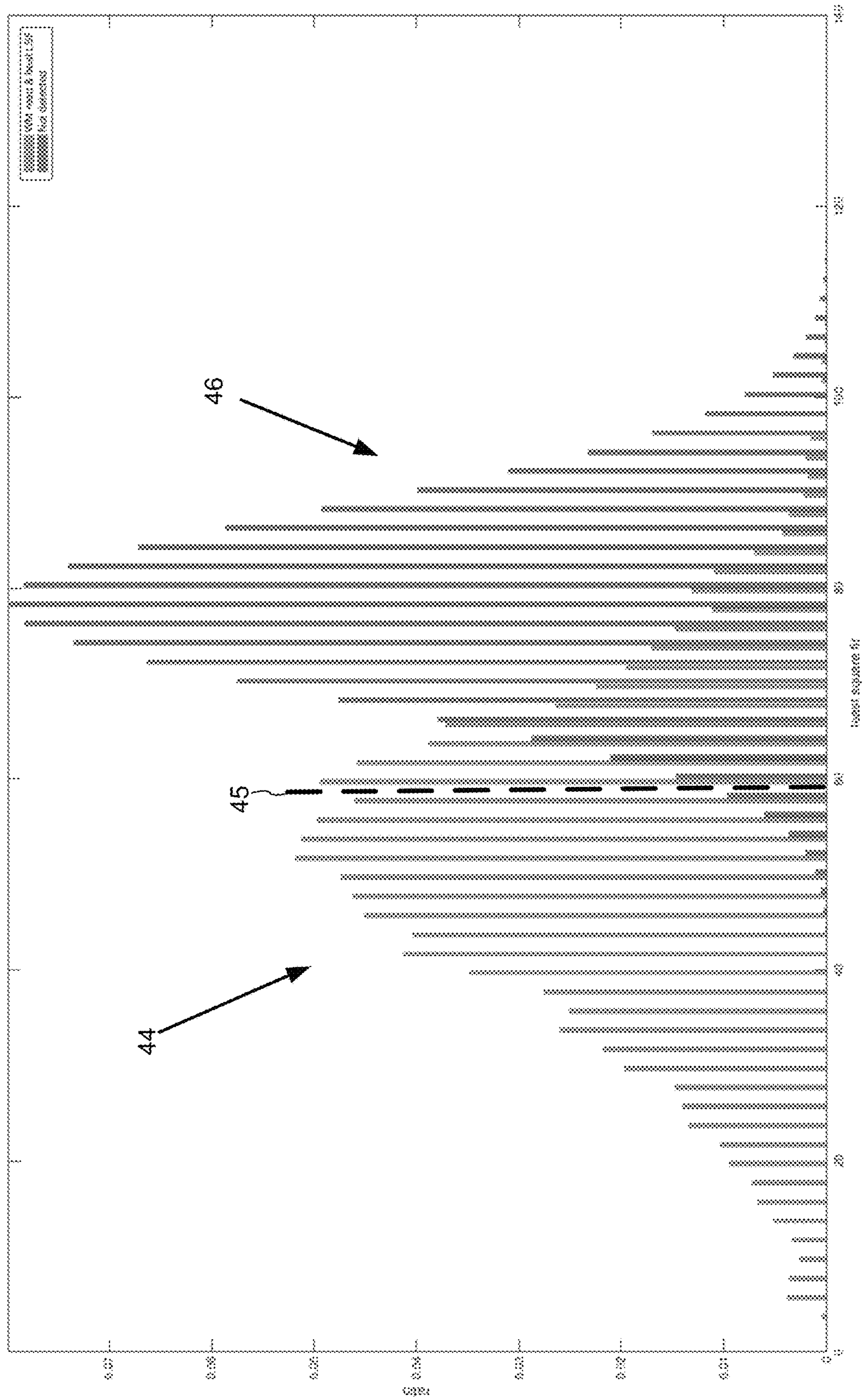
FIG. 8 is another diagram illustrating histograms, like FIG. 7, but for a different, noisier set of test images.

FIG. 8 is a diagram illustrate histograms of the least squares error metric for geometric transform candidates derived from more noisy images. Like the histograms in FIG. 7, the left histogram 44 represents candidates that led to successful decodes, while the right histogram 46 represents candidates that did not. A possible threshold value of the least squares error metric is shown at dashed line 45. The metrics in FIG. 7 were generated from images captured from a horizontal camera in a fixed optical code scanner, whereas the metrics of FIG. 8 were generated from images captured by the vertical camera in that scanner. The images from the vertical camera were noisier, and that fact is illustrated in the differences in the left histograms 40 and 44 in each diagram. Generally speaking, candidates with low least squares error metrics should lead to successful decodes. The distribution of metrics from noisier images shows that there are fewer candidates with very low least squares error. Nevertheless, there is still separation between the left and right histograms, and the threshold provides an effective way to identify geometric transform candidates worthy of further refinement. As expected, the distribution of candidates that did not yield successful decodes has a similar shape in both image sets.

The process of determining this threshold for the least squares error metric is an iterative process to evaluate a large set of candidate seeds to determine whether they yield a successful decode result. This process is implemented using similar software routines as used in real time or low latency operation, but differs in that all candidates are evaluated to determine whether they yield a successful decode, rather than winnowing candidates based on their potential merit. This process executes geometric synchronization and decoding on many more geometric transform candidates than in real time or low latency operation. Starting from initial seed candidates, the iterative process determines a new transform for an input candidate and checks whether it yields a successful decode. If it does, it is labeled as such. For the remaining candidates, the process continues until a termination condition is reached. The termination condition may be a predetermined number of iterations, or a condition in which a convergence metric must be satisfied to continue. For example, iterations starting with a particular seed continue so long as a correlation metric (e.g., correlation metric in block 30) yields an improvement over the correlation metric of a prior iteration.

To differentiate candidates that lead to a successful decode from those that do not, all of the candidates are input to an iterative refinement process. In an iteration of refinement, a geometric transform candidate is input to process of: transforming the reference signal with the geometric transform as in block 22, updating the location of transformed signal coordinates as in block 24, and determining a new geometric transform as in block 26.

The new geometric transform for each candidate input candidate and suspect image block from which the transform is derived are input to an attempted decode process. The attempted decode process first completes a synchronization process in which translation parameters are determined. It then compensates for the geometric distortion to synchronize the suspect image block and attempts to decode a valid message from the synchronized image block.

A decoder applies the resulting transform (e.g., affine+translation parameters) to sample image date from a suspect image block to sample pixel data, extract encoded message bit estimates, and decode an encoded payload message. The validity of the decoded payload message is checked with error detection (e.g., a CRC) to determine whether the input geometric transform yields a successful decode. These are similar decode operations to those performed in a low latency or real time mode, yet they are attempted on many more geometric transform candidates. The use of thresholds and other metrics (e.g., correlation) during the low latency and real time modes drive down computational complexity, as they limit refinement of the geometric transform estimates and decode attempts to candidates that more accurately estimate the geometric distortion of the suspect image. They also increase the operational envelope and enable the evaluation of a greater number of geometric transform candidates.

Figure 9:
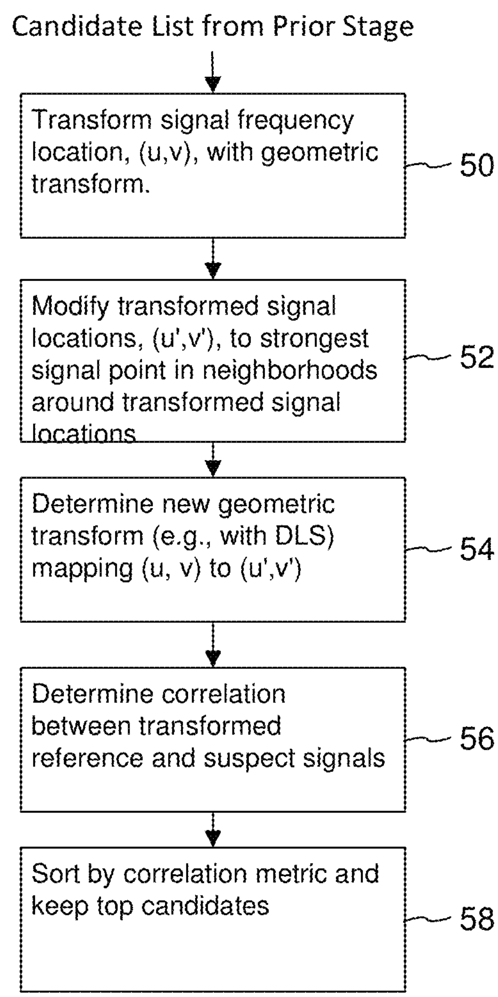
FIG. 9 is a flow diagram illustrating a refinement stage for refining geometric transform candidates.

FIG. 9 is a diagram illustrating a refinement stage in which the candidates from FIG. 6 are refined further. The processing of blocks 50, 52 and 54 is similar to the processing of blocks 22, 24 and 26, namely: The processing module of block 50 transforms each of the reference signal coordinates of the components of the reference signal by a transform candidate. This is repeated for each transform candidate.

The processing module of block 52 updates the coordinates of the transformed reference signal to the location of the strongest suspect signal in a neighborhood around the transformed reference signal coordinates. This is repeated for each component of the reference signal, and each transform candidate. At the end of this process, there is a transformed reference signal, for which each updated component coordinate (u',v') has a corresponding counterpart component coordinate (u, v) in the reference signal. As noted above, the region from which the updated coordinates are obtained is adaptive in some embodiments.

The processing module of block 54 takes each of these sets of corresponding coordinate pairs and determines a new geometric transform. This process employs the least squares calculator of block 26. It need not compute the least squares error metric. Instead, processing proceeds to block 56, which computes a correlation metric as in block 30.

Processing module 58 sorts the candidates by correlation metric and keeps K top candidates, where K is a parameter selected for the application.

The resulting top candidates from this refinement stage may be submitted to yet another refinement stage, similar to the one of FIG. 9. In some implementations, we have found that two stages of refinement are sufficient to produce satisfactory geometric transform candidates for subsequent image processing (e.g., message decoding).

There are various ways to optimize the above methods for alternative implementations. In one implementation, the computation time of the first stage is reduced by using a subset of the components of the reference signal. For example, in an embodiment where the reference signal is comprised of 64 peaks in the spatial frequency domain, one half the peaks (32) are used in the first stage, rather than all of the peaks. In particular, the 32 peaks closest to DC (corresponding to zero frequency) in the spatial frequency domain are used in the first stage. This approach reduces the computations needed to update the coordinates of the transformed reference signal in block 24 and the number of computations in determining the new transform (in the least squares calculator block 26), in determining the error metric in block 28 and in determining correlation in block 30. The subsequent refinement stages use all of the peaks. In alternative implementations, the initial stage uses 16 of the 64 peaks, and later stages progress to using more peaks, ending with all 64 peaks being used.

Another optimization reduces complexity of the process for determining updated location for transformed reference signal components. This is used, in particular, to make the processing of the coordinate update process in block 24, FIG. 6 and block 52 in FIG. 9 more efficient. In the optimization, a process determines updated coordinates for each potential transformed signal location of the reference signal component and stores them in a look up table. Then, during execution of stage 1 (FIG. 6) and refinement stages (FIG. 9) the coordinate update at each transformed reference signal location is a look up operation in this look up table.

Figure 10:
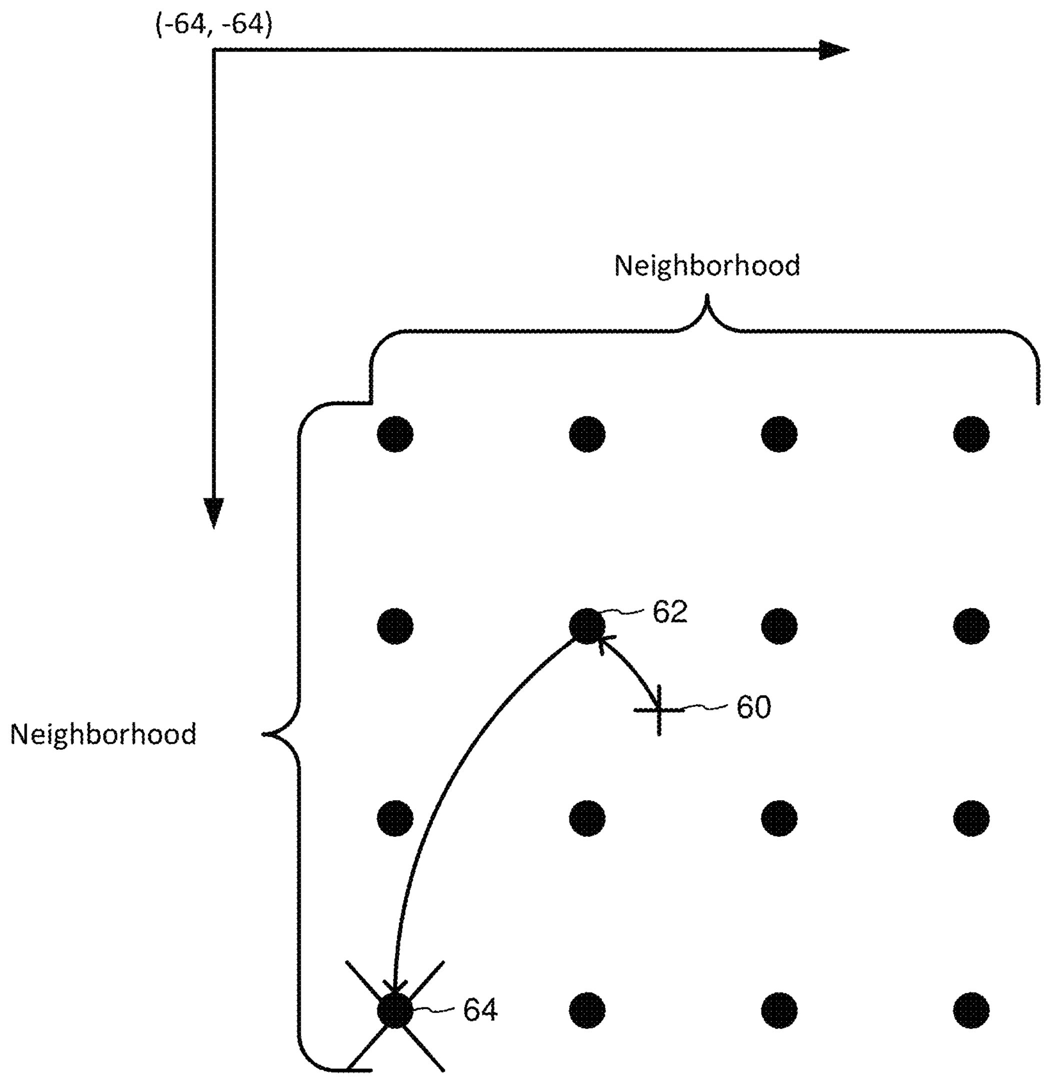
FIG. 10 is diagram illustrating aspects of a method for updating transformed reference signal coordinates.

FIG. 10 is diagram illustrating aspects of a method for updating transformed reference signal coordinates. As described above, this method searches a small neighborhood around a transformed reference signal coordinate in a block of suspect image data to find a new location where a potential reference signal component is located. In an implementation where the reference signal component is a peak, this new location is at the coordinates in the neighborhood where the suspect signal is the strongest. For reference signal peaks in a spatial frequency domain, the suspect signal is a block of sample values in the spatial frequency domain. For example, the spatial frequency domain is computed on a block of 128 by 128 spatial image data, using a FFT to produce a 128 by 128 block of spatial frequency values at integer coordinates ranging from −64 to 64. FIG. 10 shows a portion of the spatial frequency domain near one corner of the block, at coordinates (−64, −64). To update coordinates, the process begins with the transformed reference signal location, which is shown at 60 in FIG. 10. A floor function round the coordinates to a neighboring location 62 at integer coordinates. Next, the coordinates are updated to the location of the strongest signal in the neighborhood. The sample neighborhood bounding the region in which new coordinates can be found is shown by the brackets labeled "Neighborhood". In this example, the location of the strongest signal is at coordinates labeled 64. The coordinate update process updates the transformed coordinates to the coordinates at this location.

As described above, our optimized method for efficient execution processes the suspect image block at each potential rounded location of a transformed reference signal coordinates to determine the updated coordinates for that location. For the sake of explanation, we refer to the location as the neighborhood location, as it is the location that defines where the neighborhood is formed around the transformed reference signal coordinates. The method steps through each location of a neighborhood and finds the location of a potential reference signal component in the neighborhood around that location. The new coordinates are stored in a look up table for subsequent use in the iterative process of refining the geometric transform candidates. Since the updated coordinates are pre-computed in one scan of the suspect image block, redundant operations are eliminated, and instead, the step of determining updated coordinates is a look up operation. The input to the look up table is the location of the neighborhood (e.g., rounded coordinates of the transformed reference signal component) and the output is the updated coordinates of the potential reference signal component in that neighborhood.

In one implementation, operations of the method of FIG. 6 are subdivided and executed on separate processing units. One group of operations entail processing of components of the reference signal, individually. A second group of operations entail processing vectors of these components, once prepared by operations of the first group.

The first group includes the operations for updating and loading updated coordinates of a reference signal component into a first buffer (e.g., first vector register). One of these operations reads datum randomly placed in memory, e.g., reading a reference signal component value and loading the value in the first buffer. The process of updating coordinates, for example, is implemented using a look up table, which takes as input the coordinates of a transformed reference signal component, and produces as output updated coordinates, which are loaded into the first buffer.

The second group include vector multiply and add operations, such as the dot product and correlation operations on vector arrays of the reference signal and suspect image signal components. These operations are performed on the vectors of reference signal components loaded into the first buffer, as the next set of vectors are loaded into a second buffer. Processing of the first and second buffers alternate. As one is loaded by a first processing unit, a second is operated on by the second processing unit.

Computational efficiency is improved by arranging operations of the first group and second groups into modules executed by first and second processing unit types suited for each. The tasks allocated to the different types of processing units are executed in parallel, utilizing the plural buffers. The processing time for the first group tends to be longer than the second. Thus, as individual operations are performed by a processing unit of the first type on reference signal components, plural vector operations are performed in a processing unit of the second type.

This optimized processing configuration is particularly advantageous for determining geometric transforms of sparse reference signal components, comprising features such as peaks, corners or the like. Sparse, in this context, refers to the spaced apart arrangement of signal components in a coordinate space, such as spatial domain, spatial frequency domain or other transform domain. The operations of the first group prepare and load coordinates of the sparse components in a vector register, and the operations of the second group are performed in parallel on the vector register. The reference signal has for example, 32 or 64 components, and plural transform candidates are evaluated for the reference signal. Therefore, parallelism is exploited by processing plural transform candidates Single Instruction, Single Data (SISD) processor units are well suited for the first group, whereas Single Instruction Multiple Data (SIMD) or Multiple Instruction-Multiple Data (MIMD) processor units are well suited for the second group of operations. As noted, the first group includes operations like loading coordinates of reference signal components, randomly placed in memory. SISD processor units are more efficient for these types of operations. SIMD and MIMD are fast and efficient at executing vector operations on vectors of reference signal components. The ARM NEON processing architecture is one example that has both these types of processing units. GPUs may also be used for the second group of operations.

In an embodiment configured for this architecture, the coordinate update process executes on the ARM processing unit adapted for executing the first group of operations efficiently, and the vector operations of the least squares calculator execute on the NEON processing unit. These vector operations include the dot products of the vectors, whose output is input to compute the least squares error metric. The SIMD processing unit executes plural dot products on pairs of reference signal and transformed reference signal coordinates in the time required to load the next vectors of reference signal coordinates. The NEON processing unit executes dot products of the least squares calculator and least squares error input in parallel for plural transform candidates (e.g., 8 seed candidates). Parallelism is exploited across the vector of reference signal components and plural transform candidates. The additional dot products for the least squares error come at little or no additional computational cost in the SISD-SIMD/MIMD configurations because they are performed in the time consumed to load the next vectors for additional geometric transform candidates.

The geometric transform parameters and error metric are computed from the dot products executed on the SIMD or MIMD processing unit. There is no need to revert back to the affine transforms and compute an error metric, as it is computed from the dot products already computed. This substantially increases the efficiency of evaluating a large number of transform candidates, which is necessary to extend the operational envelope of the detector.

Having described geometric transform recovery technology, we now describe devices in which the technology is used. The details of the implementation vary with the hardware and software configuration of the image capture device. One device where the technology is used is on smartphones, where it is integrated into a mobile application program or the mobile operating system.

Other devices where it is used are image based scanners. Image based scanners typically fall into two classes: fixed and hand-held. Fixed scanners are designed to be integrated within a check-out station, at which the operator or a conveyor moves items in the field of the scanner's image capture system. The image capture system is comprised of optical elements, such as a lens, mirror(s), beam splitter(s), 2D imager (e.g., CMOS camera), which together enable capture of plural views of an object that are combined into a single frame. Additionally, an illumination source is also included to illuminate the object for each capture. See, e.g., US Publications 2009206161A and US2013206839A, which are incorporated by reference.

Hand-held scanners are, as the name implies, designed to be held in the hand and pointed at objects. They have different optical systems adapted for this type of capture, including lens, sensor array adapted for capturing at varying distances, as well as illumination source for illuminating the object at these distances.

These image based systems capture frames in range of around 10 to 90 frames per second. In some imager based scanners, processing of a frame must be complete prior to the arrival of the next frame. In this case, the scanner processing unit or units have from 10 to 100 ms to decode at least one code and perform other recognition operations, if included.

In other imager based scanners, image processing of image frames is governed by time constraints, not strictly frames. In this form of real time image processing, the processing unit or units within the device process frames concurrently but when processing capacity reached, some frames get dropped, and processing resumes on subsequent frames when processing capacity is available. This type of resource management is sometimes employed opportunistically in response to detecting an object in the view volume of the scanner's imaging system. For example, as a new object enters the view volume, an image process executing within the scanner detects it and launches decoding processes on subsequent frames.

Figure 11:
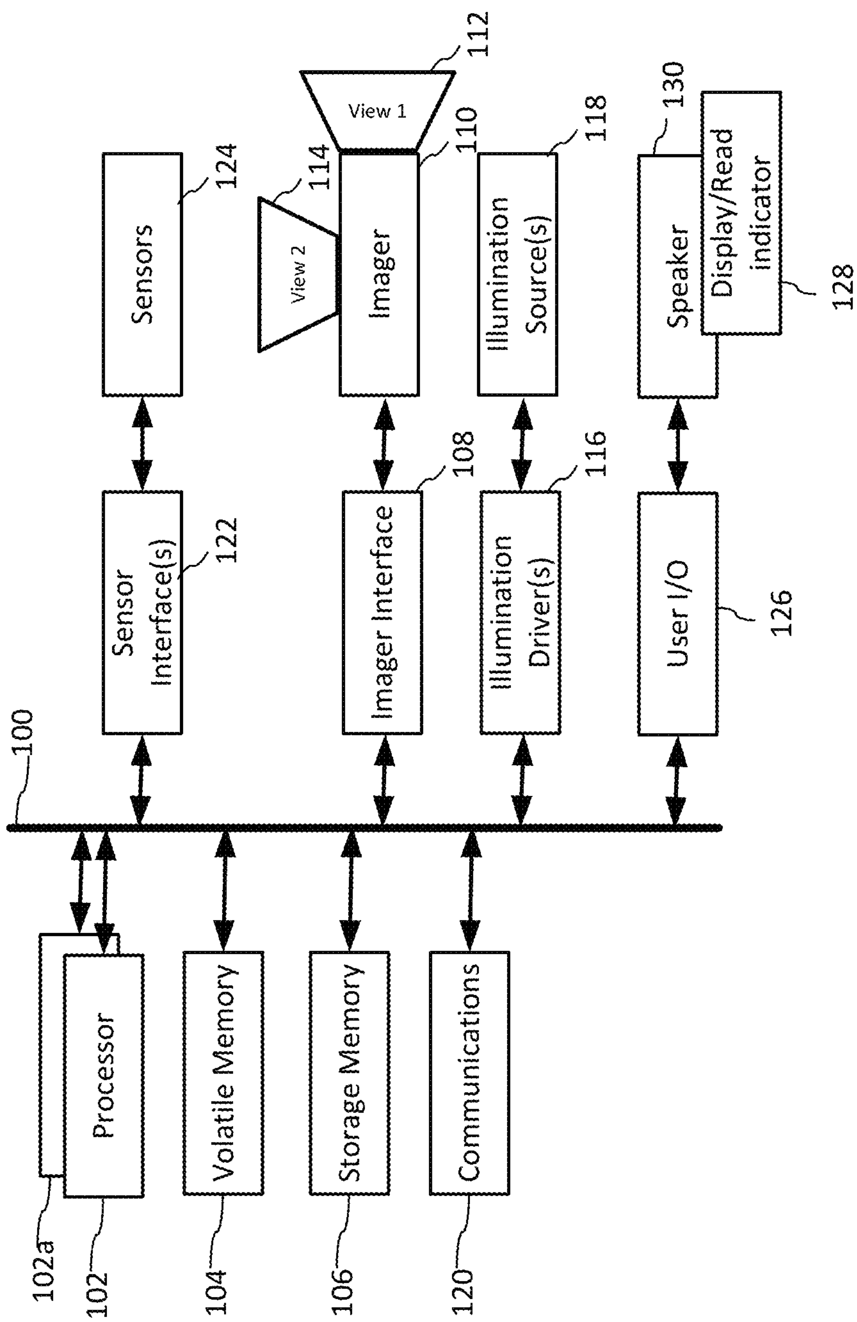
FIG. 11 is a diagram of components in an imager based scanner.
Figure 12:
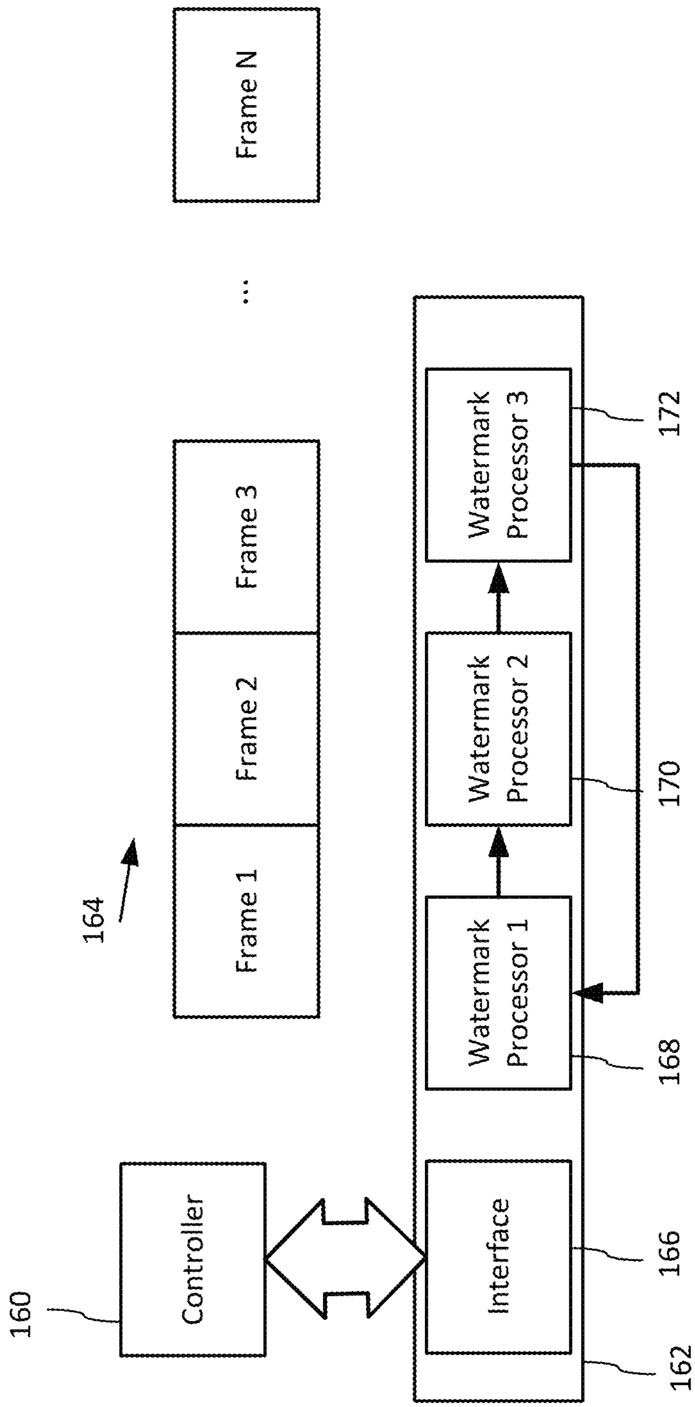
FIG. 12 is diagram illustrating a software modules that operate on a sequence of image frames to detect, synchronize and extract digital payloads from images of objects within the frames.

For the sake of illustration, FIG. 11 is a diagram of components in an imager based scanner. Our description is primarily focused on fixed, multi-plane imager based scanner. However, it is not intended to be limiting, as the embodiments may be implemented in other imaging devices, such as hand-held scanners, smartphones, tablets, machine vision systems, etc.

Please also see the specification of assignee's co-pending application Ser. No. 14/842,575, HARDWARE-ADAPTABLE WATERMARK SYSTEMS (now published as US Application Publication No 20170004597), which is hereby incorporated by reference. This specification describes hardware configurations for reading machine readable data encoded on objects, including configurations usable with imager based scanners used in automatic identification applications.

Referring to FIG. 11, the scanner has a bus 100, to which many devices, modules, etc., (each of which may be generically referred as a "component") are communicatively coupled. The bus 100 may combine the functionality of a direct memory access (DMA) bus and a programmed input/output (PIO) bus. In other words, the bus 100 facilitates both DMA transfers and direct processor read and write instructions. In one embodiment, the bus 100 is one of the Advanced Microcontroller Bus Architecture (AMBA) compliant data buses. Although FIG. 11 illustrates an embodiment in which all components are communicatively coupled to the bus 100, one or more components may be communicatively coupled to a separate bus, and may be communicatively coupled to two or more buses. Although not illustrated, the scanner can optionally include one or more bus controllers (e.g., a DMA controller, an I2C bus controller, or the like or combination thereof), through which data can be routed between certain of the components.

The scanner also includes at least one processor 102. The processor 102 may be a microprocessor, mobile application processor, etc., known in the art (e.g., a Reduced Instruction Set Computer (RISC) from ARM Limited, the Krait CPU product-family, X86-based microprocessor available from the Intel Corporation including those in the Pentium, Xeon, Itanium, Celeron, Atom, Core i-series product families, etc.). The processor may also be a Digital Signal Processor (DSP) such the C6000 DSP category from Texas Instruments. FIG. 11 shows a second processor behind processor 102 to illustrate that the scanner may have plural processors, as well as plural core processors. Other components on the bus 100 may also include processors, such as DSP or microcontroller.

Processor architectures used in current scanner technology include, for example, ARM (which includes several architecture versions), Intel, and TI C6000 DSP. Processor speeds typically range from 400 MHz to 2+ Ghz. Some scanner devices employ ARM NEON technology, which provides a Single Instruction, Multiple Data (SIMD) extension for a class of ARM processors.

The processor 102 runs an operating system of the scanner, and runs application programs and, manages the various functions of the device. The processor 102 may include or be coupled to a read-only memory (ROM) (not shown), which stores an operating system (e.g., a "high-level" operating system, a "real-time" operating system, a mobile operating system, or the like or combination thereof) and other device firmware that runs on the scanner.

The scanner also includes a volatile memory 104 electrically coupled to bus 100 (also referred to as dynamic memory). The volatile memory 104 may include, for example, a type of random access memory (RAM). Although not shown, the scanner includes a memory controller that controls the flow of data to and from the volatile memory 104. Current scanner devices typically have around 500 MiB of dynamic memory, and should have at least 8 KiB of stack memory for use by our digital watermark reader implementations.

The scanner also includes a storage memory 106 connected to the bus. The storage memory 106 typically includes one or more non-volatile semiconductor memory devices such as ROM, EPROM and EEPROM, NOR or NAND flash memory, or the like or combinations thereof, and may also include alternative storage devices, such as, for example, magnetic or optical disks. The storage memory 106 is used to store one or more items of software. Software can include system software, application software, middleware, one or more computer files (e.g., one or more data files, configuration files, library files, archive files, etc.), one or more software components, or the like or stack or other combination thereof.

Examples of system software include operating systems (e.g., including one or more high-level operating systems, real-time operating systems, mobile operating systems, or the like or combination thereof), one or more kernels, one or more device drivers, firmware, one or more utility programs (e.g., that help to analyze, configure, optimize, maintain, etc., one or more components of the scanner), and the like. Suitable operating systems for scanners include but are not limited to Windows (multiple versions), Linux, iOS, Quadros, and Android.

Compilers used to convert higher level software instructions into executable code for these devices include: Microsoft C/C++, GNU, ARM, and Clang/LLVM. Examples of compilers used for ARM architectures are RVDS 4.1+, DS-5, CodeSourcery, and Greenhills Software.

Also connected to the bus 100 is an imager interface 108. The imager interface 108 connects one or more one or more imagers 110 to bus 100. The imager interface supplies control signals to the imagers to capture frames and communicate them to other components on the bus. In some implementations, the imager interface also includes an image processing DSP that provides image processing functions, such as sampling and preparation of groups of pixel regions from the 2D sensor array (blocks, scanlines, etc.) for further image processing. The DSP in the imager interface may also execute other image pre-processing, recognition or optical code reading instructions on these pixels. The imager interface 108 also includes memory buffers for transferring image and image processing results to other components on the bus 100.

Though one imager 110 is shown in FIG. 11, the scanner may have additional imagers. Each imager is comprised of a digital image sensor (e.g., CMOS or CCD) or like camera having a two-dimensional array of pixels. The sensor may be a monochrome or color sensor (e.g., one that employs a Bayer arrangement), and operate in a rolling and/or global shutter mode. Examples of these imagers include model EV76C560 CMOS sensor offered by e2v Technologies PLC, Essex, England, and model MT9V022 sensor offered by On Semiconductor of Phoenix, Ariz. Each imager 110 captures an image of its view or views of a view volume of the scanner, as illuminated by an illumination source. The imager captures at least one view. Plural views (e.g., view1 112 and view2 114) are captured by a single imager in scanners where optical elements, such as mirrors and beam splitters are used to direct light reflected from different sides of an object in the view volume to the imager.

Also coupled to the bus 100 is an illumination driver 116 that controls and illumination sources 118. Typical scanners employ Light Emitting Diodes (LEDs) as illumination sources. In one typical configuration, red LEDs are paired with a monochrome camera. The illumination driver applies signals to the LEDs to turn them on in a controlled sequence (strobe them) in synchronization with capture by an imager or imagers. In another configuration, plural different color LEDs may also be used and strobed in a manner such that the imager(s) selectively capture images under illumination from different color LED or sets of LEDs. See, e.g., US Patent Application Publication 20130329006, entitled COORDINATED ILLUMINATION AND IMAGE SIGNAL CAPTURE FOR ENHANCED SIGNAL DETEC- TION, and Ser. No. 14/836,878, entitled SENSOR-SYNCHRONIZED SPECTRALLY-STRUCTURED-LIGHT IMAGING (Now published as US Application Publication 20160187199), which are hereby incorporated by reference. The latter captures images in plural different spectral bands beyond standard RGB color planes, enabling extraction of encoded information as well as object recognition based on pixel samples in more narrow spectral bands at, above and below the visible spectrum.

In another configuration, a broadband illumination source is flashed and image pixels in different bands, e.g., RGB, are captured with a color image sensor (e.g., such as one with a Bayer arrangement). The illumination driver may also strobe different sets of LED that are arranged to illuminate particular views within the view volume (e.g., so as to capture images of different sides of an object in the view volume).

A further extension of scanner capability is to include a RGB+D imager, which provides a depth measurement in addition to Red, Green and Blue samples per pixel. The depth sample enables use of object geometry to assist in product identification. It also provides an approximation of scale of the object (or distance of the object from the camera), which enables embodiments with this capability to concentrate the seed candidates for determining geometric transformation around the approximate scale and orientation of the object derived from the depth information.

The scanner also includes at least one communications module 120, each comprised of circuitry to transmit and receive data through a wired or wireless link to another device or network. One example of a communication module 120 is a connector that operates in conjunction with software or firmware on the scanner to function as a serial port (e.g., RS232), a Universal Serial Bus (USB) port, and an IR interface. Another example of a communication module in a scanner is a universal interface driver application specific integrated circuit (UIDA) that supports plural different host interface protocols, such as RS-232C, IBM46XX, or Keyboard Wedge interface. The scanner may also have communication modules to support other communication modes, such as USB, Ethernet, Bluetooth, Wifi, infrared (e.g., IrDa) or RFID communication.

Also connected to the bus 100 is a sensor interface module 122 communicatively coupled to one or more sensors 124. Some scanner configurations have a scale for weighing items, and other data capture sensors such as RFID or NFC readers or the like for reading codes from products, consumer devices, payment cards, etc.

The sensor interface module 130 may also optionally include cache or other local memory device (e.g., volatile memory, non-volatile memory or a combination thereof), DMA channels, one or more input buffers, one or more output buffers to store and communicate control and data signals to and from the sensor.

Finally, the scanner may be equipped with a variety of user input/output devices, connected to the bus 100 via a corresponding user I/O interface 126. Scanners, for example, provide user output in the form of a read indicator light or sound, and thus have an indicator light or display 128 and/or speaker 130. The scanner may also have a display and display controller connecting the display device to the bus 100. For I/O capability, the scanner has a touch screen for both display and user input.

FIG. 6 is diagram illustrating a software modules 160, 162 that operate on a sequence of image frames 164 captured in a scanner to detect and extract digital payloads from images of objects within the frames. This diagram illustrates an embodiment in which the above techniques are used to compensate for geometric distortion prior to extracting the digital payload from suspect image blocks. A controller 160 manages operation of plural recognition units, one of which is a digital watermark reader 162. In one embodiment, the controller 160 and digital watermark reader 162 execute on distinct processors within the scanner. For example, they execute either in the separate processors 102, 102*a*, or the controller executes in processor 102 and recognition unit executes in a processor within the imager interface 108 (e.g., DSP). In another embodiment, they execute within the same processor, e.g., processor 102, or within a DSP in the imager interface 108.

In still another embodiment, the controller executes in processor 102, and the instructions of the recognition unit are implemented within an FPGA or ASIC, which is part of another component, such as the imager interface, or a separate component on bus 100.

The digital watermark reader 162 performs digital watermark decoding to detect and extract watermark payloads from encoded data tiles in the image frames 164. The term, "frame," refers to a group of pixels read from a 2D sensor array for a time period in which a 2D image is captured on the sensor array. Recall that the sensor may operate in rolling shutter or global shutter mode. In some implementations, selected rows of the sensor array are sampled during a capture period and stored in a memory buffer (e.g., in the imager interface), which is accessed by the recognition unit(s). In others, an entire frame of all pixels in the sensor array are sampled and stored in a frame buffer, which is then accessed by the recognition unit(s). The group of pixels sampled from a frame may include plural views of the viewing volume, or a part of the viewing volume.

The digital watermark reader 162 has the following sub-modules of instructions: interface 166 and watermark processors 168, 170, 172. The interface comprises software code for receiving calls from the controller and returning recognition results from shared memory of the software process of the recognition unit 162. Watermark processors are instances of watermark decoders.

When an object moves into the view volume of the scanner, controller 160 invokes the recognition unit 162 on image frames containing the object. Via interface 166, the controller 160 calls the recognition unit 162, providing the frames 164 by supplying an address of or pointer to them in the memory of the scanner (image buffer in e.g., either volatile memory 104 or memory buffers in imager interface 108). It also provides other attributes, such as attributes of the view from which the frame originated.

The recognition unit proceeds to invoke a watermark processor 168-172 on frames in serial fashion. Watermark processors 1-3 operate on frames 1-3, and then process flow returns back to watermark processor 1 for frame 4, and so on. This is just one example of process flow in a serial process flow implementation. Alternatively, watermark processors may be executed concurrently within a process as threads, or executed as separate software processes, each with an interface and watermark processor instance.

The recognition unit 162 provides the extracted payload results, if any, for each frame via communication link as described above. The controller analyzes the results from the recognition unit and other recognition units and determines when and what to report to other software processes or external devices. Each watermark processor records in shared memory of the recognition unit 162 its result for analyzing the image block assigned to it. This result is a no detect, a successful read result along with decoded payload, or payloads (in the event that distinct payloads are detected within a frame). Optionally the watermark processor provides orientation parameters of the decoded payload, which provide geometric orientation and/or position of the tile or tiles from which the payload is decoded.

The above description provides several approaches for determining and refining geometric transform parameters of an image signal, namely a reference signal component of a digital watermark signal. These approaches may be used in various combinations to provide an implementation that is optimized for the watermark signal structure, application, imaging environment, and computational resources available for an application. As such, the approaches provide a framework for refining geometric transform parameters. Here, we provide additional examples and approaches that form part of this framework.

In some applications, we have found it advantageous to construct an embodiment of a detector that uses more rotation and scale candidates at zero tilt than non-zero tilt. This improves detection of weak watermark signals at low tilts.

We have also found it beneficial to adapt the neighborhood for updating coordinates. This pertains to both the processing of blocks 24 and 52 of FIGS. 6 and 9. In one approach, the coordinate update process (24, 52) adapts the size of the neighborhood based on location in transform parameter space. This location in transform parameter space may also be viewed from the perspective of location within the coordinate space of the reference signal. In particular, where the reference signal features being detected are in a spatial frequency space, the neighborhood size is a function of the location in that space.

In one embodiment, the coordinate update adapts the neighborhood based on scale. The neighborhood size in which it searches for a maximum around each transformed coordinate location is based on candidate scale of the location. The reference signal is comprised of impulses or "peaks" in frequency space. The original, un-distorted location of these peaks are at a frequency scale of 1. If the geometric transform causes peaks to move twice as close to DC mode of the FFT, the frequency scale is 0.5. Each transform candidate is a 2×2 affine transform. This is true for representations of the affine transform in the frequency and spatial domains, which are related. From the frequency domain affine transform "A", the frequency scale is extracted as "square_root(determinant(A))". To represent the same in terms of a affine transform in the spatial domain, it is just inverted "1/square_root (determinant(A))". This gives the scale to determine whether it is close to DC mode of FFT. As the scale moves closer to DC mode, the coordinate update process uses a smaller neighborhood. For example, the neighborhood is a 2×2 neighborhood, as opposed to a larger neighborhood of 3×3 or 4×4 coordinates around the transformed coordinate location. The scales at which the neighborhood is increased in size is based on heuristics and test results.

In some configurations, the coordinate update adapts the neighborhood size based on sampling density of candidates within candidate parameter space. As parameter density increases, the neighborhood size is smaller. Conversely, as parameter density decreases, the neighborhood size increases. Examples include using a 2×2 neighborhood below a predetermined density of scale/rotation candidates, and increasing to a 4×4 neighborhood above that predetermined density. The sampling density at which the neighborhood size is increased or decreased varies with application, and is determined heuristically through test results using watermarked objects on target capture devices, under capture conditions simulating the operating environment.

We have also observed that metrics used to evaluate transform candidates are biased based on location within the transform candidate space. In particular, the metrics are biased in terms of scale. For example, the least squares error is biased by scale. This can be visualized by considering the distance between the location of transformed coordinate in spatial frequency and actual location of a reference signal component. As the location moves outward from DC, an equivalent error, as viewed in terms of distance between the locations, gets larger. Thus, the error measure needs to be adapted by scale, or in this case, distance from DC. We address this by designing embodiments that adapt the application of the metric based on scale.

One way to adapt the metric is to sub-divide the candidates into groups by scale. This effectively adapts the metric because the metrics for candidates within a scale range have similar bias due to proximity to each other along the scale axis.

Another way to adapt the metric is to adjust the value of the metric as a function of scale. This adjustment enables candidates to be compared with each other and winnowed on equivalent, scale adjusted metrics.

Figure 17:
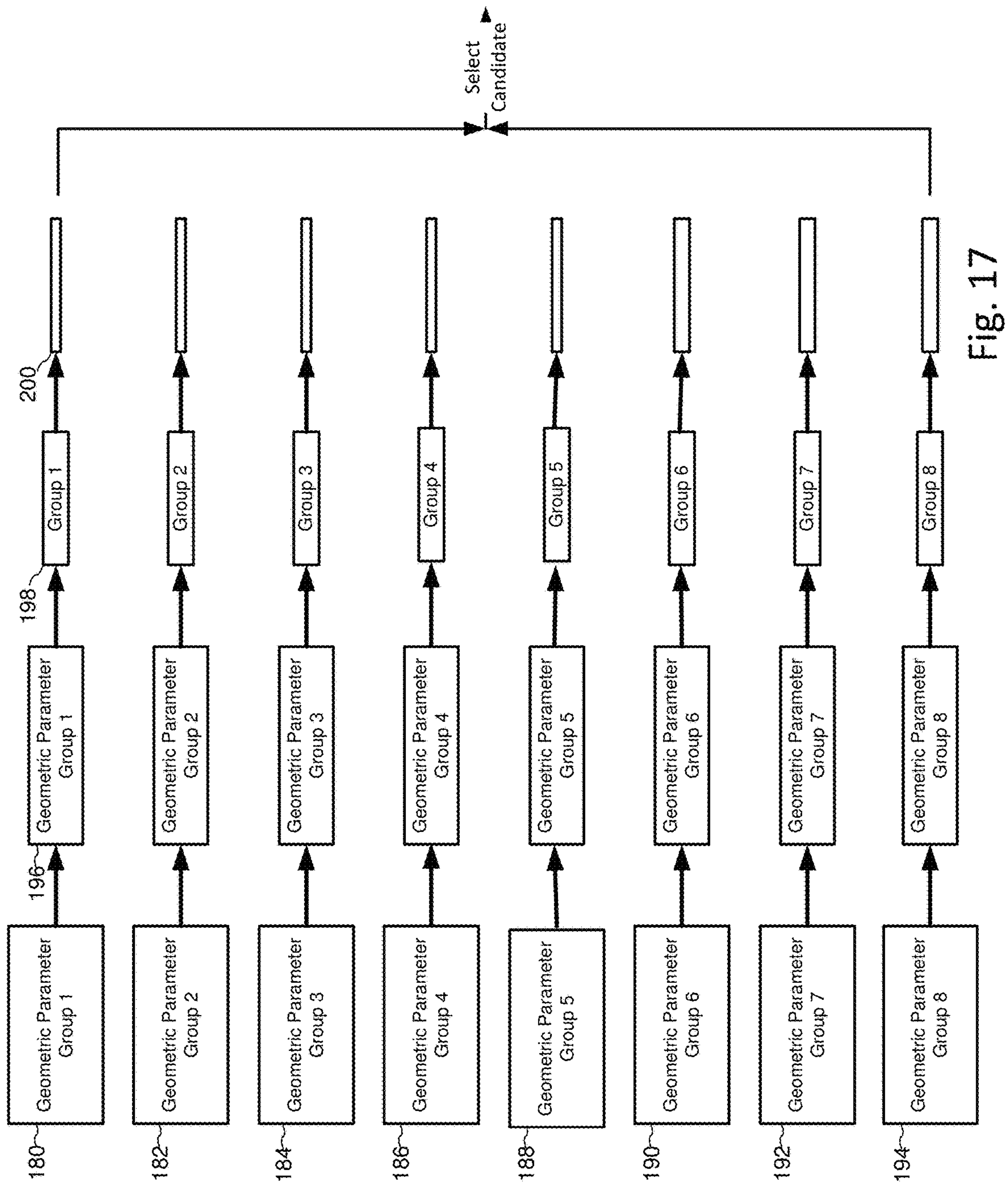
FIG. 17 is a diagram illustrating a configuration of processes for refining geometric transform parameters.

FIG. 17 is a diagram illustrating a configuration of processes for refining geometric transform parameters. Blocks 180-194 represent the initial refinement stages executed on seed candidates. The refinement stages 180-194 operate on candidates grouped together based on proximity to each other in parameter space. For example, candidates comprising scale, bearing and tilt are grouped together based on proximity in scale. One way to do this grouping is to subdivide the candidates according to scale ranges. When this approach is applied to the example of this diagram, the parameters are grouped into 8 distinct scale ranges, e.g., subdividing scale values from about 0.4 to 2.5 (250% to 40% spatial scale relative to original image size) into 8 contiguous and distinct ranges. Refinement then proceeds to reduce the candidates in each group in stages moving to the right. For example, stage 180 provides an initial refinement of group 1, and passes a subset of the best candidates based on candidate metric ranking (winnowing by thresholds) to stage 196, which in turn, passes a subset of its best candidates to stage 198. Processing continues in this manner until stage 200, at which the refinement method merges the candidates from each group based on their respective metrics.

To illustrate, we provide a specific example with reference to the above described refinement technologies. The first stage for groups 1-8 executes an initial refinement on seed candidates according to the method of FIG. 6. When the first stage gets to block 28, it sorts candidates by least square criterion, keeping top candidates from among the original seeds in the group. For one embodiment, it keeps ¼th of the original number of candidates. The proportion of candidates that pass is a configurable parameter that varies with application based on testing. At block 30, the first stage determines correlation values, and keeps the top 1/32 of original number of candidates in the group.

At the next stage, the second stage for each group executes refinement on the candidates in its group. The number of iterations using least squares criterion or correlation criterion for refinement can vary. Each stage may employ one or more iterations to refine the candidates before winnowing candidates and passing to another stage. While this embodiment uses the least squares criterion and then the correlation criterion as metrics to winnow candidates in the first stage, other embodiments may use different numbers of iterations and winnowing metrics.

In the second stage of this example, refinement processing proceeds according to the method of FIG. 9. In this second stage (196), there is one iteration of least squares refinement. The second stage evaluates correlation values, and keeps 1/128th of the original number of candidates in the group. These candidates proceed to the third stage (e.g., 198, likewise for the other groups).

In this third stage, there are 2 iterations of least squares refinement (e.g., blocks 50, 52, 54). These two iterations update the candidate parameters twice and then winnow the candidates. This third stage winnows candidates by evaluating correlation values from block 56, and keeps 1/256th of the original number of candidates in the group. These candidates proceed to the fourth stage (e.g., 200 for group 1, likewise for the other groups).

In the fourth stage, there are 3 iterations of refinement. Processing is similar to the prior stage, except for the number of iterations, and the stage ends with selection of the best candidate in terms of the candidate metric (correlation metric in this case).

Finally, as shown, the final stage of processing selects the candidate with best correlation across the groups.

The proportion of retained candidates and iterations of refinement in each stage are among the configurable parameters of this framework that are selected based on heuristics and testing, adapted at runtime, or learned over time (e.g., through a training process). Other configurable parameters are the manner in which seed candidates are selected and spaced in parameter space, the grouping of candidates, the density of candidates, and the adaptation of neighborhood sizes.

The candidates may be winnowed according to thresholds that adapt based on parameters such as the quality of the candidates, available processing resources, location in parameter space, density of candidates, similarity of candidates based on proximity in parameter space, and the like. The quality of the candidates is assessed by metrics like the least squares criterion (as least initially) and correlation criterion.

Operating Environment

The components and operations of the above methods are implemented in modules. Notwithstanding the specific discussion of the embodiments set forth herein, the term "module" refers to software, firmware or circuitry configured to perform the methods, processes, functions or operations described herein. Software may be embodied as a software package, code, instructions, instruction sets or data recorded on non-transitory computer readable storage mediums. Software instructions for implementing the detailed functionality can be authored by artisans without undue experimentation from the descriptions provided herein, e.g., written in Matlab, C, C++, Visual Basic, Java, Python, Tcl, Perl, Scheme, Ruby, etc., in conjunction with associated data. Firmware may be embodied as code, instructions or instruction sets or data that are hard-coded (e.g., nonvolatile) in memory devices. As used herein, the term "circuitry" may include, for example, singly or in combination, hardwired circuitry, programmable circuitry such as computer processors comprising one or more individual instruction processing cores, state machine circuitry, or firmware comprised of instructions executed by programmable circuitry.

Implementation can additionally, or alternatively, employ special purpose electronic circuitry that has been custom-designed and manufactured to perform some or all of the component acts, as an application specific integrated circuit (ASIC). To realize such an implementation, the relevant module(s) (e.g., encoding and decoding of machine readable auxiliary messages) are first implemented using a general purpose computer, using software such as Matlab (from Mathworks, Inc.). A tool such as HDLCoder (also available from MathWorks) is next employed to convert the MatLab model to VHDL (an IEEE standard, and doubtless the most common hardware design language). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The particular combinations of elements and features in the above-detailed embodiments are exemplary only; the interchanging and substitution of these teachings with other teachings in this and the incorporated-by-reference patents/applications are also contemplated.

We claim:

1. A method of determining a geometric transform of an image for digital payload extraction, the method comprising:

obtaining a suspect image;

executing a programmed processor to perform the acts of:

transforming the suspect image into an image feature space;

for plural geometric transform candidates, determining new geometric transform candidates by acts of:

a) obtaining transformed coordinates of reference signal components, the transformed coordinates having been geometrically transformed by a geometric transform candidate;

b) for the reference signal components, determining updated coordinates by locating an image feature in a neighborhood in the suspect image around the transformed coordinates of a reference signal component, the image feature corresponding to a potential reference signal component in the suspect image;

c) determining a new geometric transform candidate that provides a least squares mapping between coordinates of the reference signal components and the updated coordinates; parameters of the new geometric transform candidate being computed by dot product operations on the coordinates of the reference signal components and the updated coordinates; and d) from the dot product operations, obtaining a least squares error metric for the new geometric transform candidate, the least squares error metric comprising a sum of squared differences between the coordinates of the reference signal components and the updated coordinates, after applying the new geometric transform candidate to fit the reference signal components and updated coordinates;

discarding new geometric transform candidates having a least squares error metric exceeding a threshold;

refining new geometric transform candidates having a least squares error metric that does not exceed the threshold; and applying a geometric transform candidate from the refining to compensate for geometric distortion and extract a digital payload encoded in the suspect image;

wherein act b) and act c) are performed on different types of processors.

2. The method of claim 1 wherein the reference signal components comprise peaks in the image feature space.

3. The method of claim 1 wherein the image feature space comprises a spatial frequency transform domain.

4. The method of claim 1 wherein act b) is performed on a Single Instruction, Single Data processor, and wherein act c) is performed on a vector processor.

5. The method of claim 4 further comprising: executing act b) for first geometric transform candidates, while executing act c) for second geometric transform candidates.

6. The method of claim 1 including determining a location of a potential reference signal component in each of plural neighborhoods of the suspect image in the image feature space; and constructing a look up table with input being coordinates for the neighborhood, and output being updated coordinates for the location of the potential reference signal component in the neighborhood;

using the look up table in act a) to determine the updated coordinates.

7. An image processing device comprising:

a memory in which is stored a suspect image in an image feature space;

a first buffer;

a second buffer;

a processor system comprising a first processing unit and a vector processing unit;

the first processing unit configured to load reference signal coordinates of reference signal components into the first buffer, to obtain transformed reference signal coordinates for a geometric transform candidate, and for each of the transformed reference signal coordinates, locate updated coordinates of a potential reference signal component in the suspect image in neighborhoods around the transformed reference signal coordinates, and configured to load the updated coordinates into the second buffer;

the vector processing unit configured to obtain a vector of the reference signal coordinates from the first buffer and obtain a corresponding vector of updated coordinates from the second buffer and execute dot product operations on the vectors to determine a new geometric transform that provides a least squares mapping between the reference signal coordinates and updated coordinates, the vector processing unit further configured to compute additional dot products used as input to compute a least squares error metric, the least squares error metric comprising a sum of squared differences between the coordinates of the reference signal components and the updated coordinates, after applying the new geometric transform to fit the reference signal components and updated coordinates;

the processor system configured to compute the least squares error metric from output of the additional dot products for plural geometric transform candidates processed by the vector processing unit to determine corresponding new geometric transform candidates, and configured to select new geometric transform candidates to refine by selecting candidates for which the least squares error metric is below a threshold.

8. The device of claim 7 wherein the reference signal components comprise peaks of a reference signal in the image feature space.

9. The device of claim 7 wherein the image feature space comprises a spatial frequency transform domain.

10. The device of claim 7 wherein the first processing unit executes to load updated coordinates for first geometric transform candidates, while the vector processing unit operates on previously loaded updated coordinates for second geometric transform candidates.

11. The device of claim 7 wherein the processor system is configured to determine a location of a potential reference signal component in each of plural neighborhoods of the suspect image in the image feature space; and is configured to construct a look up table with input being coordinates for the neighborhood, and output being updated coordinates for the location of the potential reference signal component in the neighborhood;

the first processing unit configured to input a location for a transformed reference signal coordinate in the look up table to determine the updated coordinates.

12. A non-transitory computer readable medium on which is stored instructions, which when executed by one or more processors, performs a method of determining a geometric transform of an image for digital payload extraction, the method comprising:

transforming a suspect image into an image feature space;

for plural geometric transform candidates, determining new geometric transform candidates by acts of:

a) obtaining transformed coordinates of reference signal components, the transformed coordinates having been geometrically transformed by a geometric transform candidate;

b) for the reference signal components, determining updated coordinates by locating an image feature in a neighborhood in the suspect image around the transformed coordinates of a reference signal component, the image feature corresponding to a potential reference signal component in the suspect image;

c) determining a new geometric transform candidate that provides a least squares mapping between coordinates of the reference signal components and the updated coordinates; parameters of the new geometric transform candidate being computed by dot product operations on the coordinates of the reference signal components and the updated coordinates; and d) from the dot product operations, obtaining a least squares error metric for the new geometric transform candidate, the least squares error metric comprising a sum of squared differences between the coordinates of the reference signal components and the updated coordinates, after applying the new geometric transform to fit the reference signal components and updated coordinates;

discarding new geometric transform candidates having a least squares error metric exceeding a threshold;

refining new geometric transform candidates having a least squares error metric that does not exceed the threshold;

applying a geometric transform candidate from the refining to compensate for geometric distortion and extract a digital payload encoded in the suspect image;

wherein the medium comprises instructions configured to perform act b) and act c) on different types of processors.

13. The computer readable medium of claim 12 wherein the reference signal components comprise peaks in the image feature space.

14. The computer readable medium of claim 12 wherein the image feature space comprises a spatial frequency transform domain.

15. The computer readable medium of claim 12 wherein instructions to execute act b) are performed on a Single Instruction, Single Data processor, and wherein instructions to execute act c) are performed on a vector processor.

16. The computer readable medium of claim 15 further comprising instructions configured for: executing act b) for first geometric transform candidates, while executing act c) for second geometric transform candidates.

17. The computer readable medium of claim 15 comprising instructions which when executed by the one or more processors perform the acts of:

determining a location of a potential reference signal component in each of plural neighborhoods of the suspect image in the image feature space; and constructing a look up table with input being coordinates for the neighborhood, and output being updated coordinates for the location of the potential reference signal component in the neighborhood;

using the look up table in act a) to determine the updated coordinates.

* * * * *